United States Patent [19]

Renegar

[11] Patent Number: 6,024,571

[45] Date of Patent: Feb. 15, 2000

[54] FOREIGN LANGUAGE COMMUNICATION SYSTEM/DEVICE AND LEARNING AID

[76] Inventor: Janet Elaine Renegar, 508 6th St., Radford, Va. 24141

[21] Appl. No.: 08/839,978

[22] Filed: Apr. 24, 1997

Related U.S. Application Data

[60] Provisional application No. 60/016,635, Apr. 25, 1996.

[51] Int. Cl.[7] .............................. G09B 19/00; G09B 19/06
[52] U.S. Cl. ........................................... 434/157; 434/157
[58] Field of Search .................................. 434/156, 157, 434/167; 283/46

[56] References Cited

U.S. PATENT DOCUMENTS

| | | | |
|---|---|---|---|
| 680,311 | 8/1901 | Browne | 283/46 |
| 1,271,856 | 7/1918 | Cook | 273/293 |
| 2,385,452 | 9/1945 | Lande | 434/157 |
| 2,493,668 | 1/1950 | Gonzalez | 434/157 |
| 3,081,560 | 3/1963 | Agud | 434/157 |
| 3,435,542 | 4/1969 | Barouh | 434/157 |
| 3,724,100 | 4/1973 | Surel . | |
| 3,724,102 | 4/1973 | Van Patten | 434/157 |
| 3,871,115 | 3/1975 | Glass et al. | 173/111 |
| 4,311,465 | 1/1982 | Jacobs | 434/157 |
| 4,964,044 | 10/1990 | Kumano et al. . | |
| 5,073,054 | 12/1991 | McDowell . | |
| 5,145,376 | 9/1992 | Krass . | |
| 5,713,739 | 2/1998 | Yu | 434/157 |

FOREIGN PATENT DOCUMENTS

| | | | |
|---|---|---|---|
| 2459518 | 2/1981 | France | 434/157 |
| 2628842 | 12/1977 | Germany | 434/157 |
| 1578649 | 11/1980 | United Kingdom | 434/157 |

*Primary Examiner*—Paul J. Hirsch
*Assistant Examiner*—Michael B. Priddy
*Attorney, Agent, or Firm*—James Creighton Wray; Meera P. Narasimhan

[57] ABSTRACT

In a hand-held, paper-based translation system linguistic content is sequentially displayed to facilitate a step-by-step process for simple sentence-generation and customary conversational exchanges. The system includes literacy-based, phonetic pronunciation. The device, which houses translation data, provides rapid manual and visual accessing. A primary display surface (approximately 13 by 8½ inches) folds horizontally and vertically, creating distinct quadrants. Tab-indexed sheets affixed to the primary surface provide display areas for expanded-content. Displays of first-language (L1) words/phrases, accompanied by second-language (L2) equivalents and transliterations are grouped, categorized and sequentially displayed according to their positions in a predetermined syntax. To formulate a sentence, the user begins in the upper-left quadrant, selects an L2 word from the Sentence Starters section and progresses to the upper-right quadrant (Action Words) for the L2 verb. The user completes the sentence with words from the lower-right quadrant (Support Words) and lower-left quadrant (A–Z lexicon). Commonly used phrases, questions and responses are displayed on the back of the upper section of the primary display surface. To access phrases, the user folds the upper section forward and down.

20 Claims, 4 Drawing Sheets

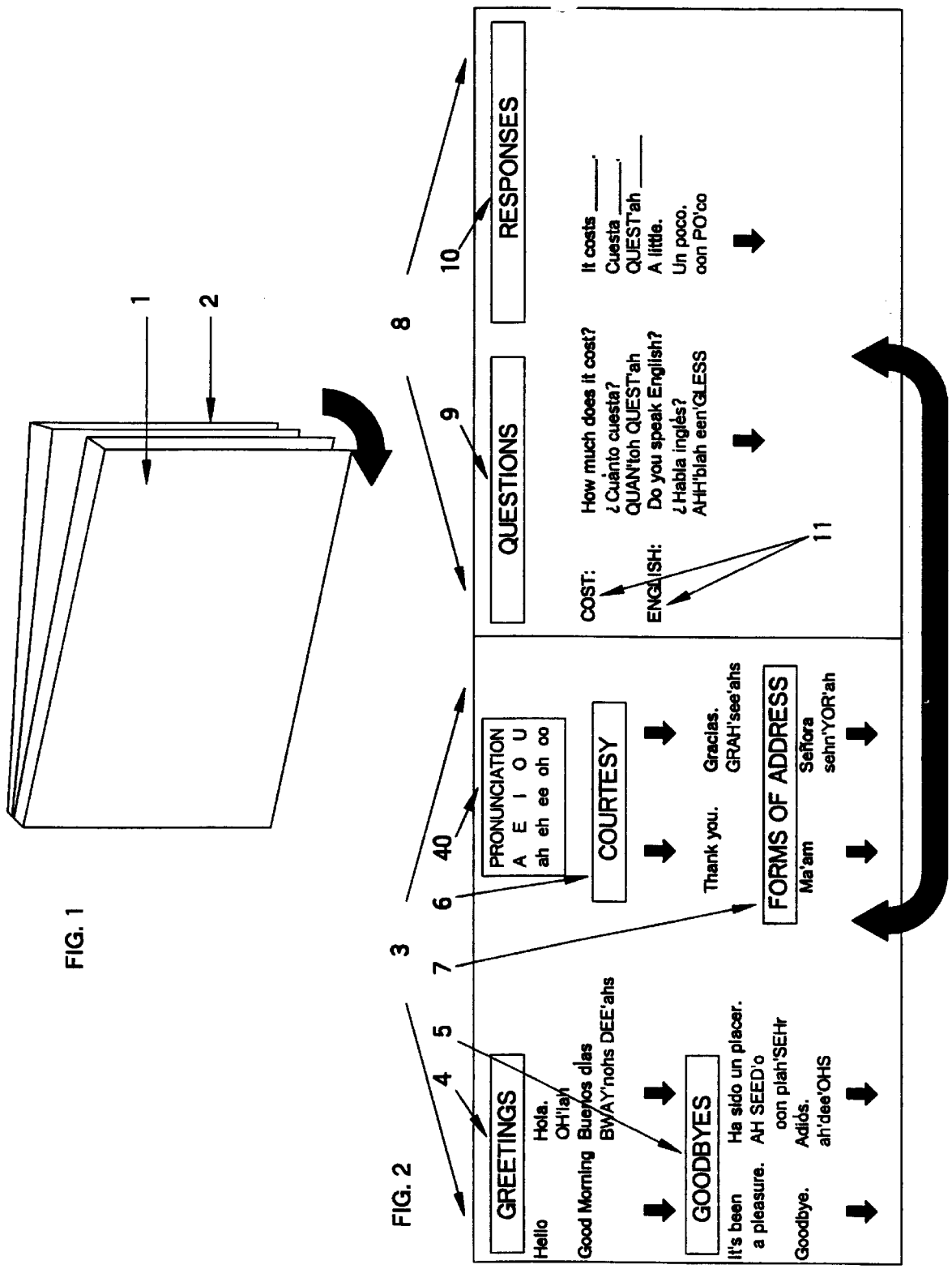

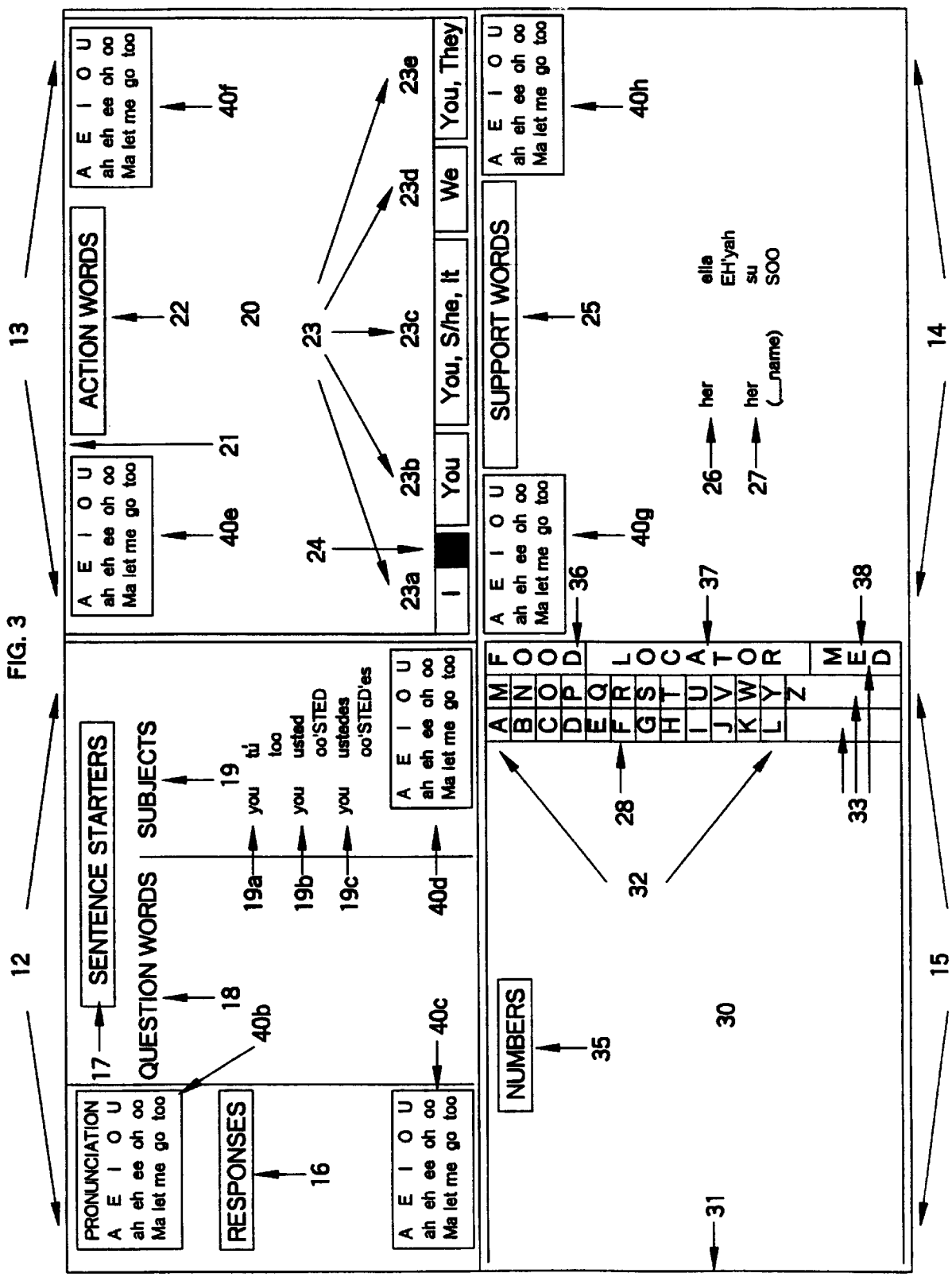

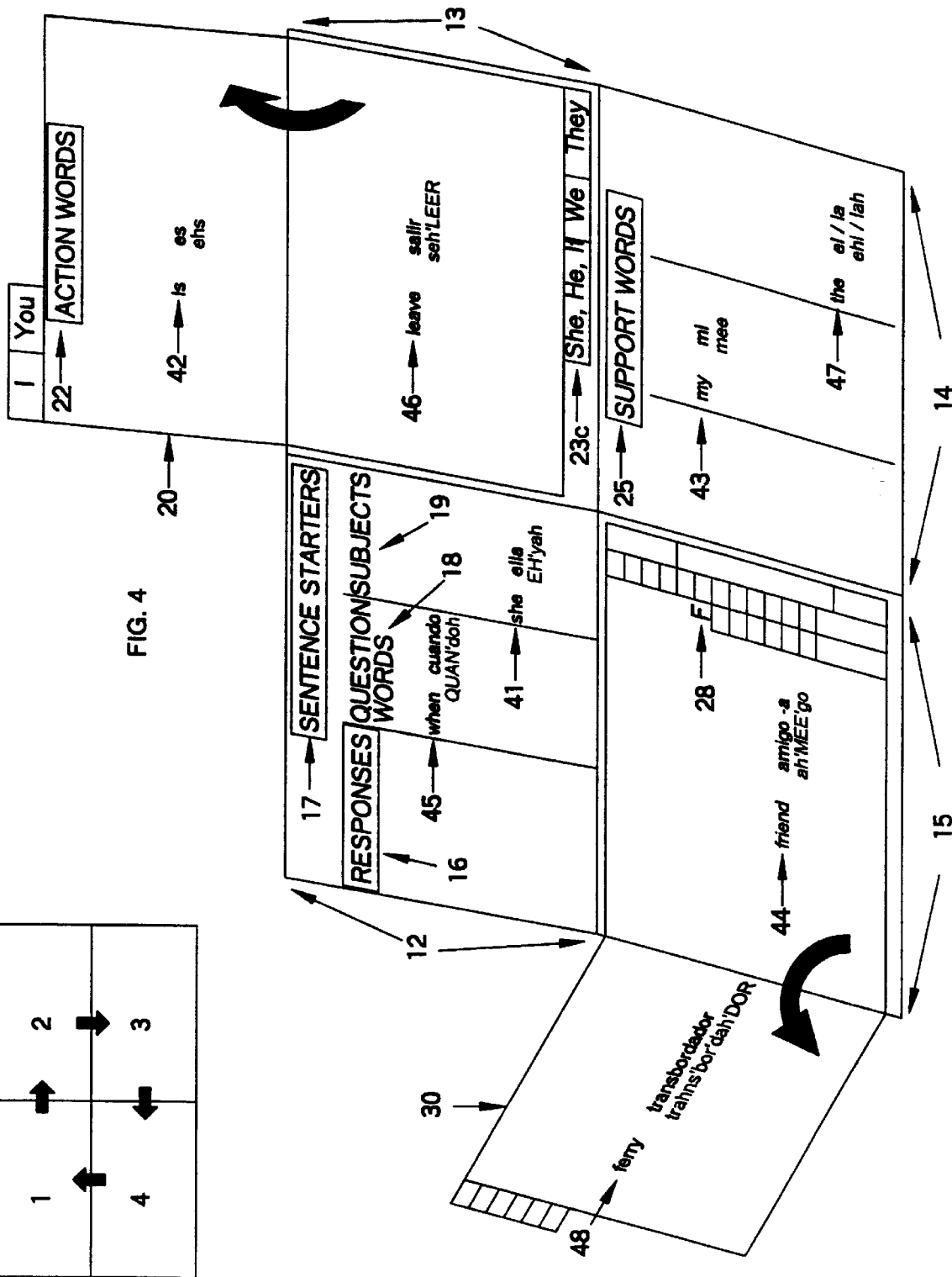
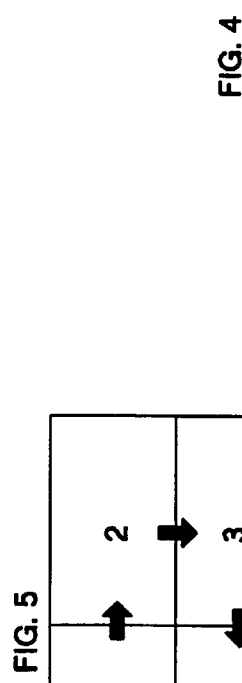
FIG. 4
FIG. 5

FOREIGN LANGUAGE COMMUNICATION SYSTEM/DEVICE AND LEARNING AID

This application claims the benefit of U.S. Provisional Application Ser. No. 60/016,635, filed Apr. 25, 1996.

BACKGROUND OF THE INVENTION

The present invention proposes a significant reform in the approach to second-language (L2) communications. Discussion of prior art necessitates re-evaluating the core assumption on which foreign language communication is based: that second language (L2) interactions must be based on memorization.

From a practical perspective, the memory-dependent approach has proven ineffective. Two problematic aspects of memorization are time and timing. Cumulative memorization processes require long-term commitments of time for study and for practice. Many aspiring L2 speakers are unable or unwilling to invest extensive amounts of time in learning an L2. Furthermore, many are interested only in casual use of the L2—for instance, for basic communications during a trip to a foreign country.

Timing is a problem in that L2 knowledge tends to decline with non-use. Often, opportunities for L2 study do not coincide with opportunities for using the language in contextualized environments. For example, numerous individuals have studied foreign languages in high school or self-paced programs only to have "forgotten everything" by the time their knowledge could be of benefit in professional and/or travel settings. Such individuals often face a frustrating cycle of repeatedly restarting L2 study programs.

Prior art methods, systems and apparatus emphasize production of materials for decontextualized study (academic) environments. That approach has been the norm despite the preponderance of evidence indicating a relatively weak link between L2 acquisition and L2 learning. This is illustrated by the millions of bilinguals (adults and children) who have acquired L2 skills at work or play, on trips, on the streets, or just "picking up" the language. Development of the present invention is based on the premise that providing effective academic reinforcement in contextualized settings maximizes potential for L2 communication and assimilation.

For individuals interested in developing L2 proficiency, the ultimate need for cumulative memorization of L2 fundamentals remains constant. However, current methodology directed toward facilitating memorization and learning may be problematic from pedagogical and product-development perspectives. Research indicates a probability that knowledge gained in decontextualized (academic) settings does not directly transfer to contextualized (real-life) settings. Indeed many L2 students report encountering substantial difficulties in applying academically-acquired knowledge to conversations with native speakers. On-site L2 exchanges often are characterized by broad memory gaps. Thus, some researchers contend that knowledge acquired via traditional methods is of little benefit in real-life conversational interactions.

Currently there are numerous resources that address various aspects of L2 learning. Those resources include courses and instructive study guides, audio and video tapes and computer software programs. Certain products provide information on particular aspects of the L2 conversational process. For instance, lexical information is available in dictionaries and, to a lesser extent, in supplemental sections of phrase books. Discrete phrases and questions are available in phrase books and in supplemental sections of certain dictionaries. Syntactic information is available in textbooks and supplemental sections of certain phrase books and dictionaries. Verb conjugations are available in verb dictionaries and, to a lesser extent, in supplemental sections of dictionaries and phrase books. Instruction on pronunciation is available in supplemental sections of certain dictionaries and phrase books. Electronic translators provide varied alternatives, ranging from translations of one-word entries to entire sentences, with higher priced models also offering voice-replication of pronunciations.

Each existing product has specific disadvantages. Electronic translators have numerous drawbacks including high cost, inconvenience of operation, susceptibility to malfunctioning, damage, (battery) power losses, and adverse weather conditions, inaccuracies in translations, and resistance (by some consumers) to high-technology products. Also, electronic dictionaries provide no visual continuity or permanence of lexical displays, making them particularly undesirable as learning aids.

Traditional dictionaries provide such large quantities of lexical information that users often are stymied by the volume of selections and the time it takes to locate words. Furthermore, dictionaries typically lack easily accessible and understandable syntactic (word order) and pronunciation support. Similarly, phrase books provide so many predefined sentences that the resultant volume effects a tedious search process, thus hindering access to a desired phrase.

There are additional drawbacks relative to particular aspects of L2 communication. Phonetic transcriptions in dictionaries and phrase books are often difficult to read and vocalize. Supplemental instructions on how to use those systems are difficult to access, typically being located in separate sections of the book. When the appropriate section is finally located, users often find a complex system of instructions that is difficult to apply on a letter-by-letter, sound-by-sound basis. Those problems render existing systems ineffective. The resultant effect is that users may ignore the resources and/or produce very low quality pronunciations. Typically, generation of original sentences also is addressed by providing instructive guidelines in supplemental sections. However, application of that information requires extensive study and practice prior to application in conversational settings.

A fundamental problem exists in that traditional approaches to L2 communications and learning have effected a fragmented and confusing market. The plethora of problems inherent in learning a foreign language are traditionally addressed by diverse, aspect-specific solutions. However, in many situations, the consumers' interests are better served by consolidating solutions rather than providing products that address only particular aspects of the language. Furthermore, it would be advantageous to provide a product that capitalizes on innate capacities of the aspiring L2 speaker, thereby reducing the user's taskload relative to learning and/or communicating in the L2.

In short, there is a significant and widespread need for new products that are simplified, centralized, rapid-access and that serve as resources for aspiring L2 speakers who simply wish to engage in basic conversations with native speakers, but do not choose to invest an extensive amount of time and energy in the effort.

SUMMARY OF THE INVENTION

The present invention addresses the above problems by providing a cohesive, holistically integrated translation system that enables the user, with or without prior L2 training, to immediately begin communicating in the foreign language. The consolidated system provides instant access to L2 data, including certain predefined phrases and a process for formulating original sentences on a step-by-step basis. The present system is preferably embodied in a hand-held device that houses a novel translation system in which linguistic components are grouped, categorized, and sequentially displayed in a one-step-accessing system. The master system incorporates provision of a graphic framework for linguistic components that also serves as a flow-chart for sentence structuring.

In the present invention, the physical device comprises a large, primary-display surface and two smaller assemblies of tab-indexed sheets. The large surface is folded into four quadrants that provide distinct areas for displaying linguistic data. Categories of linguistic material containing small quantities of data are imprinted directly on the larger, fixed-display surface. Categories that include large quantities of data are displayed via assemblies of tab-indexed sheets which are attached to one or more of the remaining quadrants. The majority of the tab-indexed sheets are singularly labeled, thereby providing constant visual indicators of the contents of each sheet. The user has constant visual access to either the specific word s/he may need (in a fixed-display quadrant) or a label indicating where the word can be located in a tab-indexed assembly.

The translation system comprises two primary categories of data displays: predefined phrases and independent lexical data for generating original sentences. Displays of L1 (first language) headwords are accompanied by their L2 equivalents and transliterations. The speech-production system provides L1 literacy-based, phonetic transliterations in the user's familiar alphabet and pronunciation prompters that are prominently displayed in strategically located areas of the device.

In the present invention, several key aspects of translation needs are addressed via methods that are system-oriented, rather than instructive, in nature. The need for memorized vocabulary is replaced (or supplemented) by a method for rapidly accessing words and phrases. The need for knowledge of syntax is addressed by providing a visual framework in which lexical data is sequentially and functionally categorized. That framework serves as a flow chart for the sentence-structuring process. Clarification of grammatical variations between languages are provided by brief (one or two-word) notations and/or by implication of sequential placement—i.e., the word's position in the sequentially-aligned syntactic framework. Semantic clarifications are provided by brief, one to two-word annotations or examples of usage. The need for L2 pronunciation skills is replaced by a novel transliteration system that is phonetically-oriented and based on L1-literacy norms. Exposure to irregular phrases is accommodated by providing categorized groups of phrases in an instant-access environment. Grammatical guidance is provided implicitly (via the word's positioning in the syntactic process) and/or by brief annotations or examples of usage. The need for knowledge relative to conjugating verbs is replaced by a novel instant-accessing system specifically designed for retrieval of conjugated verbs.

It is a primary object of the present invention to serve as a communication tool. Toward that end, the invention provides L2 translation data in a manner such that the data may be sequentially accessed with such speed so that the user may rely on the invention, rather than his/her memory of vocabulary and grammar, as a primary source of support in conversational exchanges. The present invention enables users to formulate and communicate simple sentences in 10–30 seconds.

The user's primary task is to recall locations of words rather than the words themselves. In the present invention, that requires learning two general locations of data rather than memorizing approximately 2000 words and phrases. The task is further simplified in that the word groups for sentence structuring are functionally categorized and sequentially displayed.

It is a further object of the present invention to serve as a learning aid. The present invention serves as a learning aid in a number of ways. Stationary displays of words and phrases in simplified categories are easily accessed for use in conversation and for purposes of review and study. The user's knowledge that words or phrases can be easily accessed increases confidence. Visual memory also reinforces recall of words and phrases. Additionally, displays of L2 translation data are grouped in a tangibly fixed, user-friendly format that encourages casual review of discrete aspects of L2 information.

Typically, after finding a particular word or phrase, the user of a dictionary or phrase book closes it or turns to another page, thereby losing the entry. If the user wishes to repeat or review the word, the user must repeat the entire search process. Since searching through traditional books is tedious, the user often is reluctant to repeat the process. The user of an electronic translator faces a similar problem—the data is visually "lost" after clearing the screen. Also, use of an electronic translator requires constantly keying in first-language data. That actually may hinder L2 learning since repeated focus on L1 data is viewed as counterproductive to the process of learning the L2.

In contrast, the user of the present invention has the security of knowing that the word or phrase will always be in the same, easily-accessible location. Thus the user of the present invention quickly can re-access words or phrases, due to the combined impact of the system's simplified design and the process of visual memory which often aids individuals in recalling the visual context in which data appears.

Thus, through a combination of active involvement, casual review, passive exposure, and incidental learning the user may experience improved L2 proficiency, apart from or in conjunction with a traditional L2 study program.

These and further and other objects and features of the invention are apparent in the disclosure, which includes the above and ongoing written specification, with the claims and the drawings.

BRIEF DESCRIPTION OF THE DRAWINGS

FIG. 1 is a perspective view of the translation device in its closed position.

FIG. 2 is a perspective view of the device of FIG. 1 when first opened, revealing data relative to selected phrases.

FIG. 3 is a perspective view of the device of FIG. 1 when fully opened, revealing the original sentence generation system.

FIG. 4 is a perspective view depicting the device of FIG. 1 as held and utilized by an individual.

FIG. 5 illustrates the sequential progression of steps for generating original sentences.

DETAILED DESCRIPTION OF THE PREFERRED EMBODIMENTS

Figure 7:
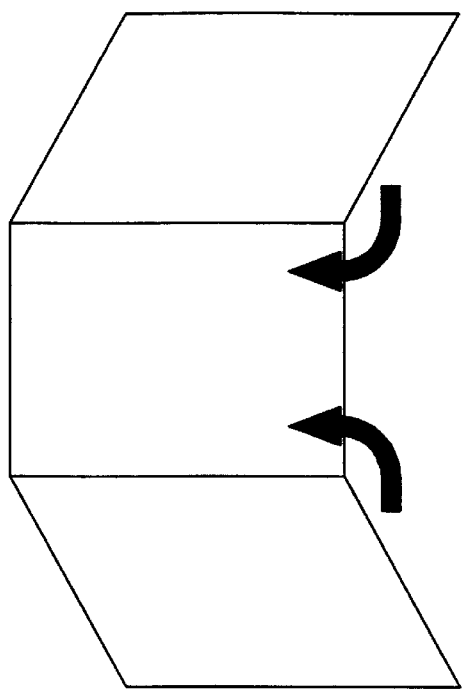
FIG. 7 is a perspective view of an alternative embodiment of the device.

For purposes of simplification, unless otherwise specified, the English language will serve as the L1 model and Spanish will serve as the L2 model in the following description of the present invention. Also, unless otherwise indicated, the following disclosure will refer to a preferred embodiment of the invention designed for English-to-Spanish, general-use applications. Converting the present communication system to accommodate other languages or applications requires implementing modifications relative to the physical device design, linguistic content, and pronunciation system, all of which are considered under the scope of the present invention.

The present invention is a communication system comprising a device having a multi-tiered network of interdependent linguistic systems and methods of data presentation that facilitate performance of tasks relative to processing and converting L1 data to L2 vocalizations. These include: visual identification, cognitive recognition and processing of L1 and L2 data, and L2 speech production.

The present invention provides virtually instant access to translation data required for basic dialogue, including certain predefined phrases and a virtually "grammar-free" process for formulating original sentences on a step-by-step basis. Additionally, the linguistic components are presented in a manner that establishes a realistically sustainable level of communication.

The present invention preferably accomplishes those goals by providing a hand-held device that houses linguistic components that are grouped, categorized, and sequentially displayed in a manner that permits one-step manual/visual accessing while concurrently providing cognitive processing support. The L2 is distilled to approximately 2000 words, including approximately 200–250 core words. The user has constant visual access to core words, which are categorized and strategically positioned in stationary displays.

In preferred embodiments the communication system appeals to a wide consumer market. Toward this end the present invention is designed for simplicity, economy and convenience. It is also preferred that translation systems be one-way, that is having English to Spanish or Spanish to English versions produced as separate devices. In so doing, the resultant reduction in the quantity of data to be presented ensures the potential for distilling languages down to fundamental elements without sacrificing the potential for carrying out objectives relative to compact size.

The present invention includes 1) a translation system, 2) a pronunciation system, 3) a physical device, and 4) a method for utilizing said systems and device. Linguistic divisions of the translation system include:

1. Predefined phrases. Phrases are organized according to sequence of contextual use and/or alphabetical order of lead words or key-word labels.
2. Independent (singularly displayed) words/phrases for formulating original sentences. Said words/phrases are grouped according to functional categories and strategically displayed in correspondence to a predetermined syntactic sequence.
3. A Pronunciation system that comprises modified phonetic transliterations of Spanish equivalents, accompanied by displays of speech-sound production prompters.

The physical device for the translation system serves as a data delivery mechanism, providing permanent displays of linguistic data in a graphic framework that complements cognitive processing and minimizes the eye and hand movements required for rapid data-accessing. Provision of said system entails grouping vocabulary words and phrases in categories that are functionally and sequentially positioned to coincide with a predetermined syntactic structure. Although it is preferred that designs of the device be modified for language-specific needs, it is believed that the general parameters of preferred embodiments of the communication system as disclosed herein may serve as a delivery mechanism for diverse interlingual systems, particularly for languages of Indo-European origin.

In the present invention, the physical device comprises a flat surface of semi-flexible material (paper, card stock, vinyl, plastic, laminated paper, or other material on which data may be legibly printed).

FIG. 1 shows the physical device folded to its closed position—as it might be viewed by the prospective consumer in marketing environments such as catalogs or stores. In this position, said device measures approximately 6 by 4½ inches and fits conveniently in a purse or pocket. Front and back panels 1 and 2 serve as display areas for marketing information, instructions, and other information such as text, graphics, photographs, illustrations, and other indicia. However, in custom-designed adaptations of the invention, cover panels also may serve as auxiliary data-display areas for specialized applications of the present invention. For instance, either or both cover panels may be used to display phrases developed for specific applications—e.g. phrases that might be particularly beneficial to physicians, educators, business professionals, or other users.

When first opened, as shown in FIG. 2, the device is viewed as a long, horizontal surface, measuring approximately 13 by 4½ inches. In this orientation, the user may view concise groups of categorized, predefined phrases. The section of predefined phrases is designed to facilitate communication in basic social interactions, which typically require utilization of phrases that have complex structures and therefore are inappropriate for word-for-word translation. This section provides displays of phrases that are commonly used in social exchanges or that are of particular use to individuals traveling in foreign countries.

Phrases are compiled, grouped, and categorized according to application-specific criteria and priorities. It is strongly preferred that selected phrases be brief or condensed.

Entries in the first column of the left section 3 include categories of condensed phrases such as Greetings 4 and Goodbyes 5, which are displayed according to their probable sequence of use in conversation. In the second column, other phrases, such as Courtesy statements 6 and Forms of Address 7, are displayed alphabetically according to lead-words of the phrase. It is preferred that phrases be one to four words in length, thereby conforming to spatial limitations of a single column. By displaying phrases in the above manner, the process of visual accessing is simplified, thereby increasing the ease and speed with which the user may identify data.

The display panel 8 on the right contains frequently-used Questions 9 and Responses 10. Those entries are displayed alphabetically according to pre-assigned key-word labels. Key-word labels 11 characterize or summarize a question in one or two words, thus providing a means by which questions may be alphabetized. For example, questions such as, Do you speak English? What is your name?, and Where is (the rest room)?, are assigned key-word labels of ENGLISH, NAME, and WHERE, respectively. Each phrase is accompanied by its L2 equivalent and a modified phonetic transliteration. Thus the above entries may appear as:

|  | QUESTION | RESPONSE |
|---|---|---|
| ENGLISH: | Do you speak English? | A little. |
|  | ¿Habla inglés? | Un poco. |
|  | AH'blah een'GLESS? | OON PO'co |
| NAME: | What is your name? | My name is ___. |
|  | ¿Cómo se llama? | Me llamo ___. |
|  | COH'moh seh'YAH'mah? | mey YAH'mo ___. |
| WHERE: | Where is the (restroom)? | It is ___. |
|  | ¿Dónde está (el baño)? | Esta___. |
|  | DOHN'deh | eh'STAH___. |
|  | eh'STAH (ehl BAHN'yo)? |  |

In traditional phrase books, the user must first locate the appropriate section of the book (such as "Introductions", "Shopping", "Hotel"), then scan individual areas of the topic, reading all or part of numerous entries on several pages until the exact phrase needed is found. That process is very cumbersome and time-consuming.

In contrast, use of key-word labels in the present invention significantly accelerates data-accessing. The user rapidly identifies a desired phrase or question by scanning the list of words, rather than reading each entry in its entirety. This significantly reduces cognitive-processing steps and eye movement required for identification of desired phrases.

The design and layout of preferred embodiments of the present invention establish visual distinctions between pre-defined phrases and the original sentence-generation system. Predefined phrases occupy an area of the device which, though readily accessible at all times, creates no visual disruption while the device is being used in its fully-open position—for constructing original sentences.

In the fully-open position, the entire primary-display surface is revealed, as shown in FIG. 3. Said surface measures approximately 13 by 8½ inches. Horizontal and vertical fold-lines, as shown in FIG. 3, create four quadrants or sections that provide distinct display areas 12, 13, 14 and 15. Said sections are used for displaying components of linguistic data that are relative to the original sentence-generation system.

The sentence-generation system comprises select groups of frequently-used words/phrases that are functionally grouped, categorized, and strategically placed in displays that correspond to their sequential order of occurrence in a predetermined syntactic sequence. Additionally, within the context of the above format, L1 entries are accompanied by their L2 equivalents and transliterations.

In the present invention, the upper-left section 12 and lower-right section 14 of the primary surface are designated areas for stationary displays (components of linguistic data that are visible at all times during the sentence-generation process). These sections present displays including relatively small quantities of data that are imprinted directly on the primary surface. This allows the user to access approximately 200–250 core words by visually scanning the primary display.

Categories containing large quantities of data are displayed via two smaller (approximately 5½ by 4 inches) assemblies that comprise pluralities of tab-indexed sheets of paper or other material on which data may be legibly printed. One such assembly 20 is affixed to the upper-right quadrant of the primary display surface; another such assembly 30 is affixed to the lower-left quadrant.

Tab-indexed assemblies substantially facilitate the one-step accessing process. Lexical content is divided into letter or category-specific groups that are edited to conform to the spatial limitations of discrete double-page layouts. Each layout is individually labeled to indicate the nature of its content. This provides constant visual access to a series of index-tabs that indicate the contents displayed on each double-page layout.

The present device is designed in such a manner that assemblies 20 and 30 may be opened without obstructing the user's view of sections 12 and 14, which provide constant visual displays of data. Thus the user may derive a general awareness of the entire system's contents by quickly scanning the contents of stationary displays and the index labels.

The above mentioned interlinking network of displays is presented in a graphic format that also serves as a syntactic flowchart for sentence generation. Said format incorporates a clockwise pattern of progression. The syntax is adequate for comprehension in both the L1 and L2, but is particularly compatible with a syntactic structure of the second language.

Thus, utilizing the sentence-generation system, a word from the first (upper-left) section 12 may be used as the first word of a sentence; a word selected from the second section 13 may be used as the second word of a sentence, etc. Therefore, by selecting and pronouncing L2 equivalents according to the sequential pattern of the above framework, the user may automatically create a coherent sentence in the foreign language. In this way the sentence-generation system serves as a comprehensive prompter/translator, suggesting not only the vocabulary that might be used in L2 dialogues, but also the syntactic flow of sentences.

It is an object of the present invention to provide a delivery device that is effectively manipulated in varied contextual settings (e.g. at airports or restaurants, while shopping, etc.) Toward that end, the device is ergonomically designed to facilitate simplified physical-manipulation or hand-operation tasks. Toward that end, the device is designed to be held in the left hand at the center of the left edge near the horizontal fold-line as shown in FIG. 4. By holding the device in this manner, the user's left wrist provides support for sheets of the lower-left assembly as it is opened for accessing data. Thus, the user may use his or her right hand to execute specific manipulations of the device. The above method of grasping and manipulating the device allows single-motion accessing of tab-indexed displays. Furthermore, the device is easily manipulated without the need for resting the device on a support surface, such as a table.

The system that supports original communications is presented on the four inside panels (or sections) of the device. In the present invention, the linguistic data relative to original conversational exchanges comprises Responses and Sentence Generation. Responses 16, as shown in FIG. 3, are displayed in the first column in the upper-left section. Responses 16 include selected words and phrases the user is likely to hear after making a statement or asking a question (e.g. yes, no, maybe, etc.). The remainder of the primary-display surface provides data relative to the original-sentence generation system.

Linguistic components of the original Sentence-Generation System are displayed according to the syntactic sequence deemed most appropriate for effecting original communications. The first components of the system are displayed in the second and third columns of the upper-left section 12. This section is labeled Sentence Starters 17 and includes sub-headings of Question Words 18 and Subjects 19 which are commonly used to begin sentences. The second section 13 (top right) provides a tab-indexed assembly 20 that contains displays of verbs that are conjugated, grouped, and indexed according to 'person' (as well as number, tense, and mode). The lower-right quadrant 14 provides a display of frequently used core or Support Words 25 that frequently occur in the third position of the syntactic sequence. An additional tab-indexed assembly 30 is affixed to the lower-left section 15 of the device. This assembly includes expanded presentations of lexical data, including: 1. a general (A–Z) lexicon of words/phrases and special lexical categories that are organized and labeled according to functional use (e.g. Numbers 35, Food & Restaurant 36, Destination Locator 37, and Health & Medical 38).

Referring again to Sentence Starters 17, this category includes words and phrases that frequently are used to begin questions or statements. This category provides a body of baseline words for initiating sentences. The object of the category is to provide prompters that serve to control the nature and direction of sentence structuring, thereby minimizing the probability that the speaker will begin sentences with words that tend to elicit complex sentence structures. For instance, rather than saying "If you don't have anything else to do, why don't you go to dinner with us?", the novice speaker is subconsciously encouraged to reframe the English thought, converting it to a more elementary form of communication such as, "You go to dinner with us?"

Incorporation of the above method of lexical categorization restricts the nature and number of words with which speakers may construct original sentences. The resultant visual format of the translation system serves as a subconscious prompter to the user, implicitly encouraging the user to begin sentences with one of these words. This imparts a subconscious sense of 'place' or point of reference in the language. To maintain the positive impact of this simplification measure, the category must contain neither too few nor too many words.

The Sentence Starters category 17 includes a subcategory of Question Words (interrogatives) 18 such as who?, when?, where?, and why? It is preferred that this category also include interrogative phrases that are commonly used in the L2. For the Spanish translation system, interrogative phrases include such phrases as: of whom?, from where?, for whom?, etc. Inclusion of such phrases provides the user with opportunities for incidental exposure to phrases the user is likely to hear in conversations, but is unlikely to look for in the process of constructing sentences. Thus through the process of incidental learning, the aspiring speaker becomes aware of the existence of these phrases, thereby increasing the user's chances of comprehending them in the context of dialogue. This increases the likelihood that the aspiring speaker will begin to use them appropriately in generating sentences.

The category of Sentence Starters also incorporates a subcategory for Subjects 19. That category includes words (normally pronouns) frequently used to begin sentences. In the present embodiment, those include words such as "I", "you", "it", "this" and "those". In keeping with the object of providing a virtually grammar-free system, it is preferred that this category also include multiple entries and/or explanatory notations that serve as clarifications for words that have distinctive meanings in one language, but overlapping semantic connotations in the other language. For instance, the word "you" in English may be used in the singular or plural regardless of the speaker's relationship to the listener. However, in Spanish, there are 4 forms of "you" that may be used as a subject. Depending on the cultural context in which the word is used, proper usage of the word "you" may be contingent on the number of persons addressed and the speaker's relationship to the listener. To minimize references to grammar, this issue is addressed via multiple entries for the word "you" 19*a*, 19*b*, & 19*c*, each of which is paired with a different L2 equivalent. It is preferred that this category also include relative pronouns such as "this", "that", "these" and "those". This significantly expands the aspiring speaker's repertoire of fundamental words on which to base structuring of simple sentences.

In traditional formats, sets of conjugated verbs are categorized according to tense or the infinitive of the verb. In such materials, all 5 or 6 persons of the verb are grouped together by tense and presented in a context of multiple verb displays. To locate and pronounce the desired form of a conjugated verb, the user must search multiple sections and pages of the reference material and then scan up to 110 entries to find the appropriate verb inflection. For many users, this process is cumbersome, complicated and confusing.

In contrast, the present invention provides a novel verb presentation system that enables the user to instantly access specific forms of verbs. In the preferred embodiment, the verb assembly (Action Words) contains displays of inflections of verbs.

In the upper-right section 13, an assembly of sheets 20 is affixed to the primary display surface. Said assembly comprises a plurality of tab-indexed sheets on which data may be legibly printed and which are of such size as to fit within the constraints of one section or quadrant of the primary display surface. In the present embodiment, said sheets may be approximately 5 inches by 4.25 inches and joined at the top edge 21 by means of stapling, gluing, spiral binding, or other means of binding. Said sheets may also be approximately 8.5 inches by 5 inches and folded horizontally at the center, thereby yielding the equivalent of two contiguous display surfaces.

Said assembly includes one or more series of sequentially aligned index tabs 23*a*–*e* at the lower edges of respective sheets. Index tabs may be extensions of or attachments to discrete display sheets. Said tabs may be of paper, plastic, or other materials which either adhere to or can be otherwise affixed to the edges of sheets. It is preferred that tabs be of a durable material, laminated, or otherwise modified to resist effects of moisture and frequent usage.

Index tabs serve to facilitate the lifting of uppermost sheets above lowermost sheets. Incorporation of this method of display allows the user to rapidly access information by lifting uppermost tab-indexed sheets upward and back, thereby revealing a specific data display.

Index tabs are labeled to indicate the contents of corresponding sheets. Said tabs may display indicia such as letters, words, or other markings. Said indicia serves to identify the nature and substance of data printed on the sheet to which it is attached. Indicia may also serve to identify the nature and substance of data printed on the sheet immediately below the sheet to which it is attached.

In the present invention, inflected verbs are displayed in assembly 20. Verbs are extracted from their traditional conjugation sets, redistributed according to tense, and categorized according to person and number. For example, verbs conjugated for the person "we" are grouped together, forming a discrete category 23*d*, as are those for "I", "you, s/he" and "they". Each layout contains corresponding L1 and L2 entries. The entries of a specific verb category are limited to those which can be legibly printed on one double-page layout. Each category is tab-indexed, with labels indicating inflections for one person.

By limiting the volume of entries and pages, the user's task is physically and psychologically simplified to that of "one-page accessing". Thus, by turning to the index tab labeled "I" 23*a*, the user will find a concise, double-page layout that provides verbs that are conjugated for the person "I". Certain index-tabs may present multiple indicia—the tab labeled "You/She/He/It" 23*c*, for instance. Such labels indicate the presence, on the same double-page layout, of a verb conjugation that may be used for multiple subjects.

Incorporation of this method of verb display allows the user to instantly access a specific conjugation of a verb by lifting uppermost tab-indexed sheets upward and back, thereby revealing a specific data display.

In alternative embodiments for advance students, the verb assembly contains multiple tenses. Adjustments in designing tab-indexes are made to accommodate the additional categories. This may be accomplished by modifying the indexing system (i.e., by using color coding, etc.)

The verb assembly also may be extracted from the environment of the present invention and marketed as an independent product.

In an alternative embodiment for novice speakers, the verb assembly is excluded from the device and replaced with a fixed display of infinitives. With this version of the system/device, the user will construct sentences using infinitives rather than conjugated verbs.

A novel approach to grouping words is used to accommodate the need for limiting the number of categories presented in Constant Visual Displays. Traditionally, words have been grouped according to function (i.e. nouns, verbs, adjectives, adverbs, prepositions, conjunctions, etc.) Using this approach would result in creating 7–9 categories (labeled for parts of speech) and entering certain words in multiple categories. This would consume space unnecessarily, thereby restricting the total number of possible entries. Furthermore, use of the traditional approach would effect production of a system that would necessitate scanning various short columns to locate a single word.

To avoid these and other problems, a novel method for grouping and categorizing words is employed in selecting entries for the lower-right quadrant 14—in a Constant Visual Display position. This composite of select Support Words 25, comprises words and phrases of various parts of speech, including adverbs, adjectives, prepositions, pronouns, conjunctions, etc., (a, the, some, her, his, me, no, today, when, where, for, to, and, but, etc.) This component of the translation system provides a strategic link in the process of constructing sentences. Selected lexical entries include those which are essential to the formulation of sentences, particularly words that frequently occur in the 3rd position of the translation system's predetermined syntactic structure.

Words to be included in the category of Support Words are selected based on criteria of function, frequency of use, and likelihood of occurrence at position #3 in sentence production. Embodiments of the invention in other languages require attention to this section since it serves as a strategically balanced bridge to sentence expansion and branching.

The Support Words category includes words and phrases frequently used to qualify, link, enhance, and embellish various elements of sentences. The visual format also serves as a subconscious prompter, implicitly enticing the user to expand sentences by using one or more of these easily accessible words. Additionally, implementation of the above method minimizes the likelihood that the novice user will deviate from simple sentence structures.

To maintain the positive impact of this measure, the category must contain neither too few nor too many words. In the present embodiment, the number of entries that can be effectively presented is limited to approximately 65–70. This limitation is imposed to provide content in a visual context characterized by graphic clarity and simplicity, to provide core aspects of data in such a manner that it may be visible to the user at all times during the sentence-generation process, to provide content in a format of contextual simplicity, and to establish certain controls regarding the nature of words and phrases the user might attempt to incorporate in sentences.

Employing the above method for defining and presenting this category substantially reduces the eye-movement and hand-manipulation tasks that might otherwise be required for users wishing to access these words and phrases.

Since the category of Support Words is constantly visible, the user is repeatedly exposed to phrases that one is likely to hear in conversations. Thus through the process of incidental learning, the aspiring speaker gains increasing familiarity with these words and phrases, thereby increasing the user's chances of comprehending them in the context of dialogue and increasing the likelihood that the user will use them appropriately in generating sentences.

In the lower-left section 15, an assembly of sheets 30 is affixed to the primary display surface. Said assembly comprises a plurality of tab-indexed sheets on which data may be legibly printed and which are of such size as to fit within the constraints of one section or quadrant of the primary display surface. In the present embodiment, sheets are approximately 5 inches by 4.25 inches and are joined on one side by means of stapling, gluing, spiral binding, or other means of binding. Said sheets may also be approximately 10 inches by 4.25 inches and folded vertically at the center, thereby yielding the equivalent of two contiguous display surfaces.

Assembly 30 is bound at the left (shorter) edge 31 of the sheets. Said assembly includes one or more series of sequentially aligned index tabs 32 at the right edges of respective sheets. Index tabs may be extensions of, or attachments to, discrete display sheets. Said tabs may be of paper, plastic, or other materials which either adhere to or can be otherwise affixed to the edges of sheets. It is preferred that tabs be of a durable material, laminated, or otherwise modified to resist effects of moisture and frequent usage. It is also preferred that each series of vertical index tabs be positioned in an offset alignment, as shown in 33. Said alignment serves to ensure that tabs and their markings are constantly visible.

Index tabs serve to facilitate the lifting of uppermost sheets above lowermost sheets. Incorporation of this method of display allows the user to rapidly access information by lifting uppermost tab-indexed sheets upward and to the left, thereby revealing a specific data display.

Index tabs are labeled to indicate the contents of corresponding sheets. Said tabs may display indicia such as a letters, words, or other markings. Said indicia serve to identify the nature and substance of data printed on the sheet to which the tab is attached. Indicia also serve to identify the nature and substance of data printed on the sheet immediately below the sheet to which the tab is attached.

Each letter-specific, double-page layout contains corresponding L1 and L2 entries and is tab-indexed accordingly. The words and phrase entries of a specific alphabetical category are limited to those that can be legibly printed on one double-page layout. By limiting the volume of entries, the user's task is physically and psychologically simplified to that of "one-page accessing". Thus by turning to the letter "A", the user finds a concise, double-page layout that provides entries that (in the L1) begin with this letter.

Certain tab-indicators display multiple letters. Alphabetized groups of words that require less space are combined and jointly displayed on a single layout. For example, words beginning with the letters G and H are displayed on one layout, labeled G/H.

Said assembly 30 is used for displaying the general (A–Z) lexicon and data that is categorized according to special (functional) sections. The general lexicon contains double-page displays that are labeled with one or more letters of the familiar alphabet, as shown in 32. Each letter-specific, double-page layout contains corresponding L1 and L2 entries and is tab-indexed accordingly.

The word and phrase entries of a specific alphabetical category are limited to those which can be legibly printed on one double-page layout. Thus by turning to the letter "A", the user finds one concise, double-page layout on which is displayed a full complement of L1 lexical entries that begin with the letter "A".

Said assembly is also used for displaying data that is functionally categorized in special sections. In the present embodiment, this includes entries relative to Numbers/Money, Food/Restaurants, Health/Medical, and Locating Destinations. Said data is organized and displayed according to topically appropriate styles. For instance, data entries in the category of Numbers are displayed according to numeric sequence rather than alphabetic sequence.

In specialized sections, the body of word and phrase entries is separated into still smaller categories with corresponding sub-headings, thereby further simplifying visual and cognitive processes required for identifying specific words and phrases. Utilization of this display method further accelerates the data-accessing process and increases the possibility for rapidly effecting valid communications. This may be of particular importance in certain survival situations involving medical problems or treatments.

In preferred embodiments, the section relative to Numbers is positioned on the front page of the lexical assembly 30, thereby providing optimum visual accessibility. Said display contains subheadings of Numbers and Money. Entries relative to numbers cover numeric values ranging from zero to 2,000. Entries relative to money include terms such as coin, traveler's check, exchange rate, etc.

In preferred embodiments, the category for Food/Restaurant terms 36 occupies 2 double-page layouts and contains subheadings of Restaurant, Beverages, and Foods, each of which contains appropriately corresponding entries. Restaurant terms include words and phrases such as waiter, check and fork. The subcategory of Beverages includes words such as coffee, water and drink. The sub-category of Foods includes a comprehensive collection of words that are representative of foods common to both domestic and international regions. The subcategory of Foods also includes descriptive terms relative to food preparation and enhancement, such as fresh, baked, and spicy.

The category labeled Destination Locator 37 includes data displays that constitute a self-contained subsystem for obtaining information relative to navigating in rural and urban areas, particularly those of foreign countries. Subheadings may include topics of Questions, Instructions, Distances, Transportation, Directions, Streets & Roads, and Destinations & Landmarks. Each topic contains appropriately corresponding entries. For instance, Instructions includes entries such as "go" and "turn"; Distances includes entries such as "block", "mile" and "kilometer"; Transportation includes entries such as "bus", "on foot" and "subway"; Directions includes entries such as "left", "to", "across from" and "north"; Streets and Roads includes entries such as "address", "corner" and "traffic light"; Destinations and Landmarks includes entries such as "hotel", "bank" and "market".

The Health/Medical section 38 includes subheadings and corresponding entries for categories of Emergency and Parts of the Body. The remaining entries comprise general listings of verbs, adjectives, nouns, etc. that are typically used in communications regarding physical injuries or illnesses. The subheading of Parts of the Body includes word entries such as "arm", "stomach" and "head". The Emergency category provides words such as "hospital", "doctor" and "ambulance". The remainder of Health/Medical entries comprise a general listing of verbs, adjectives, nouns, etc. that typically are associated with physical injuries or illnesses, such as "allergy", "X-ray", "injection" and "fever".

Decisions relative to word selection are carefully evaluated since external measurements of the device impose strict limitations regarding the availability of display space. First, a fundamental body of words is selected and alphabetized. These words are then edited down to a quantity that conforms to the spatial restrictions of the target section or page. The number of words that are displayed in a section is contingent on the number of columns in the section, lines per column, font size, and other display characteristics.

Word and phrase length also impacts the number of entries that are displayed in a given column. Column width is gauged according to the average length of entries in the column. The width of columns is the primary factor in determining the number of columns that are assigned to a section or page. A combination of the above factors dictate the number of entries that are displayed on a page or section. Therefore each group of words must be sized to conform to the physical limitations of its specific page or section. Generally, discrete pages of tab-indexed assemblies accommodate 3 columns, whereas sections on the primary surface accommodate 4 columns. Within these specifications it normally is possible to display 55–75 entries per primary section and 85–110 words per double-page layout of a tab-indexed assembly.

Criteria for selecting words and phrases are based on fixed and variable factors. Fixed criteria relate to linguistically compulsory factors—words that are crucial components for structuring sentences. Structurally essential words include, but are not limited to:

1. Subjects, such as personal pronouns and/or relative pronouns
2. Frequently used verbs (e.g. to be, go, have, etc.)
3. Frequently used linking, descriptive, and/or qualifying words, such as certain adjectives, adverbs, prepositions, conjunctions, and interrogatives, (e.g. a, the, some, very, but, if, what, where, etc.)

The variable factors that impact word selection relate to those which are contingent on the nature of the application and the target market. For instance, decisions regarding inclusion of words may vary significantly, depending on whether the target audience includes tourists or medical professionals.

In addition to words and phrases based on customary elements of L1 conversation, certain entries are included to accommodate linguistic norms of the L2. For instance, the Spanish phrase, "de donde" (ENG: from where) is commonly used Spanish. Since the phrase is seldom used in typical English conversations, it is unlikely that the user would search for this phrase. Therefore, to ensure that the user is exposed to it, the phrase is displayed in a conspicuous location—on the primary display.

Certain entries are displayed in multiple areas of the device. In diverse situations users may search for a particular word in disparate sections of the device. To increase the likelihood that such searches are productive, certain commonly used words are displayed in two or more areas of the device. For instance, certain verbs (e.g. "be", "eat", etc.) are displayed under the category of Action Words and also in the A-Z lexicon. Other words (e.g. "the", "today") are included in both Support Words and the lexicon. Certain entries are also presented in a special section (e.g. Food, Medical) as well as the lexicon. Thus, by selectively duplicating entries, the resultant interlinking system of essential words establishes a lexical safety net.

Words that are essential or preferred components of the lexical system include:

1. Structurally or syntactically essential words;
2. Words that are desirable for the specific application (e.g. for tourists, specific businesses, etc.);
3. L1 and L2 words that are strict semantic equals (having precise meaning-for-meaning translations;
4. Cognates;
5. L2 words that are easily associated with an L1 word that is similar in meaning. For instance, the English verb "to understand" is translated as "comprender", which can be associated with the English verb "comprehend";
6. L2 words that are easily recognized;
7. L2 words that are easily remembered;
8. L2 words that are accepted in most L2 regions or nations;
9. L2 words that have stand-alone clarity of meaning; and
10. Words for which semantic intent or grammatical uses can be clarified in 1- or 2-word notations.

In preferred embodiments the following categories of words are excluded or are used only when other alternatives are inadequate or otherwise unsatisfactory:

1. L2 words that require grammatical explanation;
2. L2 words that invite significant negative L1 language interference;
3. False cognates;
4. Words that have diverse meanings in the L1 and/or L2;
5. Words for which L1 or L2 meanings are excessively ambiguous;
6. Words that have multiple meanings in both languages;
7. L2 words that are particularly difficult to recognize or remember;
8. L2 words that cannot be represented effectively in transliterations; and
9. L1 or L2 words that are excessively lengthy as compared to most other words in the column.

Certain categories of words are strategically displayed in areas of the device that render them visually accessible on a consistent basis. This allows the user to access over 200 core words by visually scanning the primary display. These categories include Sentence Starters and Support Words. In certain embodiments, Action Words are also presented in constant visual display formats.

Criteria for initially selecting the body of core words are based on:

1. Degree of contribution to a specific application. For instance, verbs such as "arrive" and "leave" are critical in systems designed for travelers.
2. Frequency of use in the given category. For instance, words such as "the", "and", and "for" are commonly used in English.
3. Degree of benefit to speakers who have no knowledge of L2 grammar.

The present communication system incorporates strategies for utilizing certain words and phrases in contexts that normally require grammatical instruction. Thus, it is preferred that references to grammar be avoided whenever possible. Since the object of the invention is to support communications that are adequate, not perfect, a certain percentage of grammatical errors are acceptable. Aspects of grammar that must be addressed are treated within the context of discrete words and phrases, typically by providing a multi-purpose lexical entry and/or a 1–2 word explanatory notation, or a 1–2 word example of contextual use.

In keeping with the object of providing a virtually grammar-free system, it is preferred that certain words be presented with multiple entries and/or explanatory notations. Such words include those which have distinctive meanings in one language, but overlapping semantic connotations in the other.

For instance, the English word "her" may be used in multiple contexts: as an object of a preposition, direct object, indirect object, and possessive adjective. However, in Spanish, the word "her" is represented by four discrete words and one inflection. To simplify presentation of these functional forms of the word, dual entries are provided for the word "her". The first entry 26, as shown in FIG. 3, displays the word "ella" as an equivalent. This word can be used to convey the concept of "female/singular" in numerous situations. While the word's inclusion in certain sentence structures may be grammatically incorrect, the message conveyed typically is correctly comprehended by the listener. This entry is displayed with no explanation and implicitly encourages the speaker to use this word unless otherwise indicated. The second entry for "her" 27, as shown in FIG. 4, is "su", the Spanish possessive adjective. This word is presented because the word "ella", used in the context of possession, creates substantial confusion for the listener. To distinguish between the two entries, "su" is accompanied by an example-of-use notation: "her name". Thus the entries appear:

| her | ella |
|---|---|
|  | EH'yah |
| her | su |
| (__ name) | SOO |

This method of display provides implicit instructions for using two of the four forms of the word. The exclusion of two functional forms of the word "her", (effectively ignoring major grammar points), subjugates grammatical correctness to simplicity of the display.

The above technique is employed to clarify semantic as well as functional usage ambiguities. For instance, in Spanish, discrete words are used to distinguish between concepts of the word "flat". Example-of-use notations are used to differentiate between the concepts. Thus the entry appears:

| flat | plano |
|---|---|
| (surface) | PLAH'no |
| flat | desinflado |
| (tire) | dess'een'FLAH'doh |

Variations in semantics may be clarified by using synonyms. For instance, the word "kind" is displayed twice—once with the notation 'kind' and then with the notation 'type'.

Notations are also used for semantic clarification, although only one entry is provided. For instance, the word "yard" is clarified with (meas.) to inform the user that the L2 word refers to a measurement rather than a lawn.

The above topics normally represent significant units of language instruction. However, inclusion of instructive guidelines relative to grammar slows the communication process. Such data requires additional time for reading, cognitive-processing, and application. Substituting the aforementioned strategies for providing first language and cross-lingual clarifications significantly accelerates the communication process.

As an additional measure of support, certain aspects of grammar are addressed in a traditional instruction booklet.

It is an object of the present invention to provide a simple, yet comprehensive, method of effecting instantaneous L2 pronunciation. Further objects of said pronunciation system include providing convenient on-site support for conversational interaction, improving quality of speech production (as compared to that of the prior art) and providing the system in a manner that increases the user's level of confidence in using the L2.

Primary linguistic components of the pronunciation system include a novel method for establishing the framework and parameters of speech-production; word-specific, modified phonetic transliterations of L2 equivalents; and strategically located, prominent displays of pronunciation guides or 'keys' that incorporate novel mnemonic (memory) devices.

In traditional pronunciation systems there are various problems relative to content and application. Typically, said systems address pronunciation of the entire scope of a target language. Instructional data generally includes most or all of the L2's consonants, vowels, and vowel combinations. For example, systems for English to Spanish pronunciation typically include 2 to 8 pages of instructional information and contain 15 to 47 sound/symbol entries. Such voluminous data must be displayed in a supplementary section of the book or program. To utilize the data, the user must perform numerous application and cognitive-processing steps to verbalize a selected word or phrase. Furthermore, currently available systems are too complex for beginning speakers. Effective utilization of such systems requires a considerable investment of time and effort to memorize and learn to apply the system's pronunciation rules.

From the user's perspective, the pronunciation system of the present invention is highly simplified as compared to those of the prior art. First, rather than attempting to "teach" general rules governing pronunciation of an entire language, the present system provides word-specific speech-production support. This is accomplished, in part, by providing a user-friendly phonetic transliteration of L2 equivalents. Vocalization of transliterations also is supported by the provision of pronunciation guides, which will be detailed later.

An additional drawback of traditional pronunciation systems is that they often incorporate transcriptions with symbols and/or letter combinations that are alien to the user's familiar language. For instance, the International Phonetic Alphabet transcription for the English word "eighteenth" is "'ei'ti:n0"; for "stew" it is "stju"; and for "truck" it is "tr^k". The obvious problems produced by using such peculiar symbols and letter combinations are magnified when the target word is in a foreign language.

In the present invention, the sound-symbolization system leverages the user's inherent L1 knowledge and literacy skills into a holistic approach for pronouncing L2 words and phrases instantly. A speaker's natural tendency is to pronounce sound/symbols of foreign languages in the same manner as they would be vocalized in the speaker's native language. Leveraging this innate tendency, sounds that are phonologically concurrent in the two languages are transcribed using familiar-alphabet letters. In other words, if an L2 sound exists in the L1 and can be definitively represented by an L1 letter(s), the L1 letter(s) are used to symbolize the sound in transliterations. However, the sound/symbol (letter) is inserted systemically, without referring to the substitution in user instructions or guidelines.

For instance, certain consonants are virtually phonetic and orthographic equals in English and Spanish: the letters f, k, l, m, n, and p represent the same sounds in both languages. These letters are used interchangeably to represent similar sounds.

Other sounds occur in English and Spanish and can be represented by Spanish letters, but the sounds and symbols are not orthographic pairs. For instance, the letter H is silent in Spanish and typically is deleted from its traditional placement in transliterations. The letter H also is used in other capacities: to represent the H sound of the letter G, as in "gerente" (heh'REHN'teh) (ENG: manager); or the letter J as in "jugar" (hoo'GAHR (ENG: to play). The letter H is also used as a symbol to facilitate controlling vowel sounds (AH, EH, and OH)

The sound of the letter Y (as in the English "you") is equivalent to the sound of the Spanish letters LL and, in some cases, Y. Therefore the letter Y is used in transliterations without actively instructing the user regarding the disparity. For example: "yo"=yoh (ENG: I) and "lamar"= yah'MAHR (ENG: to call).

These and other sound-symbols are interchanged as needed in transliterations. Those substitutions are transparent at the user level. Parameters for pronunciation (i.e., guidance provided by pronunciation keys) are established only for those aspects of phonology that cannot be transcribed in a manner that effects consistent verbalization. Thus the majority of sound-representation tasks are performed in the process of structuring transliterations. This eliminates the need for providing lengthy instructions and relieves the user of the need to perform numerous cognitive processing steps.

Thus, by streamlining these and other linguistic components of the pronunciation system, the speaker's focus is redirected to targeted aspects of speech production. For instance, in the English to Spanish embodiment, references to consonants are deleted, thereby enabling the user to concentrate on vocalizing vowel sounds.

A commonly used approach for phonetically transcribing vowel sounds involves representing the sounds with English-letter combinations. For example, the English to Spanish system comprises the combinations of A=AH as in father, E=EH as in met, I=EE as in see, O=OH as in go, and u=OO as in too. Vowel-symbolization systems vary according to language-specific needs.

The first letter of the vowel-symbol pair establishes the acoustic domain. The second letter governs and channels the quality of the sound to be produced. Thus, in English to Spanish transcriptions, the following examples are considered standard:

| L1 | L2 | SOUND | L2-T (Transliteration) |
|---|---|---|---|
| GIVE | dar --> | ah --> | DAHR |
| THIS | este --> | eh --> | EHS'teh |
| FRIEND | amigo --> | ee --> | ah'MEE'goh |
| HELLO | hola --> | oh --> | OH'lah |
| MUCH | mucho --> | oo --> | MOO'choh |

Vocalization of sounds is further supported by provision of pronunciation guides (or keys) #40a–h, which supply a visual framework and implicit guidelines for pronouncing specific sounds in transliterations. These displays may vary in form and content, depending on various characteristics of the target language.

In the English to Spanish embodiment, pronunciation keys facilitate memorizing and producing the sounds of L2 vowels. Said keys provide visual and linguistic mnemonic (memory) devices. These consist of five (5) primary vowel sounds, their corresponding symbols, and a brief sentence. Said sentence comprises pertinent vowel sounds that occur exclusively and in syntactic correspondence to their alphabetic sequence. Thus the linguistic mnemonic device utilized in the present invention is:

Ma let me go too. or Ma, let me go too!

The visual and linguistic devices are combined to produce a concise, pronunciation key that supplies implicit and explicit instructions for speech production. Thus, in the present invention, the pronunciation key is graphically presented as follows:

| A | E | I | O | U |
|---|---|---|---|---|
| ah | eh | ee | oh | oo |
| Ma | let | me | go | too. |

The above device serves as the fundamental (default) system for pronunciation of vowel sounds. Speech-production support for combinations of vowels and unusual combinations of consonants is addressed within the context of word-specific transliterations.

In traditional systems, there are also problems that relate to the logistics of data accessing and cognitive processing of pronunciation information. Accessing speech-production data in certain L2 resources requires that the user refer back and forth between the pronunciation section and the main body of text. For instance, to complete an English to Spanish translation, using certain dictionaries or computer programs, the user must first locate the English word and identify its Spanish equivalent. Next, the user must find the Spanish phonetic transcription, which typically is located in another section of the resource. Then, the user must refer to yet another section to obtain information on pronunciation. Finally, by referring back and forth between the various sections and pages, the user must attempt to mentally merge input from the disparate sources—all in an attempt to vocalize a single L2 word. Aspiring speakers consider this process excessively laborious and very frustrating.

In the present invention, pronunciation keys provide instant access to data on rules governing the vocalization of sound-symbol equivalencies. This is accomplished by providing prominent displays of pronunciation keys near the lexical entries. These displays are strategically located to provide optimum visual access to them.

Pronunciation keys may be positioned at or near the upper-left corners (as in 40a,b,e, & g); upper-right corners (40 f & h); and/or lower corners (40 c & d) of certain display sections, thereby providing a sense of graphic continuity. It is preferred that pronunciation keys be positioned such that there is not more than inches distance between pronunciation data and any L2 equivalent or transliteration. Implementation of this strategy reduces eye-movement required to glance between pronunciation keys and transliterations. This enables the user to glance at pronunciation keys while holding the target word in peripheral vision. The above strategy allows the user to refer to pronunciation data without visually "losing" the target word or phrase.

Incorporation of the above strategy also accelerates the phrase-construction pace by eliminating the need for referring to multiple pages or sections of materials to obtain assistance regarding pronunciation. It also cultivates a subconscious impression of simplicity, which enhances user confidence and security. The combined effect of the above strategies is the establishment of a speech-production process that is substantially simplified, as compared to those of the prior art.

The above system of sound-symbol representation provides the basis for structuring transliterations of L2 words and phrases. A transliteration of each L2 equivalent is displayed beside or below the word or phrase. In the present invention, transliterations provide a written, phonetic interpretation of speech that enables the user to quickly and effectively verbalize L2 words.

Certain traditional translation materials provide phonetic transcriptions of L2 words. However, these transcriptions are often ambiguous and confusing, serving merely as supplements for studying the resource's prescribed pronunciation system. Furthermore said systems typically are difficult to decipher (particularly those utilizing non-alphabetic symbols) and effect low quality pronunciations. Additionally, traditional transcriptions adhere to rules of syllabification, thus limiting possibilities for restructuring sound/symbols in a manner that increases user-friendliness.

By contrast, transliterations may or may not conform to rules of syllabification. In the present invention, transliterations use the letters, letter combinations, and corresponding phonemes (sound units) of the familiar alphabet to represent speech-sounds of the L2. Transliterations are word-specific and customized to conform to and to capitalize on the user's inherent knowledge of L1 phonology. In short, the system 'respells' the sounds of L2 words using selected letters of the L1 alphabet.

A serious drawback of traditional transcription systems is that they do not effect fluid pronunciation sound-streams. When reading traditionally formed transcriptions, aspiring speakers frequently insert hard pauses or stops between syllables. The resultant utterances are choppy and disjointed to the extent that the listener often cannot gauge the cadence of the sound-stream sufficiently to discern divisions of words. This may create sufficient confusion to effect a complete breakdown in communication. It was found that this may be due to the custom of indicating syllable divisions by using hyphens or center dots. For many individuals, these symbols (hyphens in particular) evidently represent a subconscious cue to pause or stop between groups of letters or numbers—such as telephone or account numbers. It is believed that this conditioned response carries over into the process of reading transcriptions and transliterations. Thus the sound-stream evoked by hyphenated transcriptions is choppy and disjointed.

This problem is alleviated in the present invention by employing the use of apostrophes to separate syllables and letter-groups. (Apostrophes traditionally have been used to indicate accented syllables.) The L1 reader is conditioned to accept apostrophes as indicators that discrete letter-groups, although conceptually separate, should be linked in the sound-production process, as in words such as "it's", "doesn't", or "Mary's". The resultant effect is that users of the present invention "read through" apostrophes in transliterations smoothly, without inserting distinct pauses. Thus apostrophes provide unobtrusive divisions between transliteration letter-groups, thereby producing a fluidity of speech production that is unequalled in the prior art.

An additional problem in traditional pronunciation systems concerns provision of stress indicators for syllables or letter-groups that are to be emphasized in speech. The customary approach has been to place an apostrophe or accent mark immediately after the letter-group that is to be emphasized. It has been found that this method is relatively ineffective, presumably because these indicators are small, unobtrusive, and have minimal visual impact.

In the present invention, this problem is resolved by using capital letters to indicate letter-groups that are to be stressed. As with other strategies, implementation of this measure provides a means of subconsciously impacting speech-production in a manner that capitalizes on the user's inherent literacy skills. Since readers are conditioned to stress capitalized words in sentences, their automatic response is to emphasize letter-groups that are capitalized in transliterations. This literacy "norm" is so widely accepted that explicit instructions to this effect are rarely required. An additional benefit is that the use of capital letters creates a visually conspicuous indicator to distinguish between stressed and non-stressed letter-groups. Thus the strong visual impact of capital letters serves as a reminder that the user must consider the element of emphasis in the process of forming speech sounds.

Transliterations initially are formed according to the previously described phonetic transcription system—by adding appropriate consonant-symbols to the vowel-symbols. The following letter-combinations serve as the fundamental (default) system for transliterating vowel sounds:

| A | E | I | O | U |
|---|---|---|---|---|
| ah | eh | ee | oh | oo |

Appropriate letter-symbols for consonants are added to the above symbols, thereby forming specific syllables. After the standard applications of phonetic symbolization are performed, the resultant transliteration is evaluated to determine the need for modifying it.

The present invention incorporates a novel system for modifying transliterations. The modification process is one in which standard phonetic transliterations are systematically altered utilizing factors that are unique to the L1 literacy perspective, thereby rendering the transliteration more visually inviting and compatible with L1 norms. The resultant effect is the formation of word-specific modified phonetic transliterations.

A primary object of word-specific modifications is to reduce the quantity of cognitive processing steps required for L2 speech-production. Modifications generally are incorporated to improve the 'readability' level of the transliteration, simplify cognitive processing, and implant visual cues that effect subconscious influences designed to improve the quality of pronunciation. Those goals are accomplished primarily by implementing modifications that decrease the volume of data the user must learn to interpret and apply during the pronunciation process, provide familiar letter-groups as replacements for unfamiliar syllables, and provide moderating elements to temper the effect of unfamiliar letter-groups in transliterations.

In certain cases, measures required to fulfill one of the above objects conflict with those required to accomplish the other. In such situations, it must be determined which (if any) modifications should be applied. These determinations are based on varying considerations. These range from the extent of need for simplifying syllables to that of adjusting sound-symbols and letter-combinations to conform to culturally-based conditioned responses.

A traditional method of representing the sound of the Spanish E is that of using the letters AY as in "say". However, most American English speakers tend to add a heavy glide when pronouncing this sound. This compromises the quality and fluidity of the speech-stream. Furthermore, this letter-combination is visually confusing in certain transcription contexts: e.g. ayl. Therefore, the letter-combination AY is used conservatively in the present invention—its utilization is limited to specific situations in which it out-performs other alternatives. For example:

| L2 | L2T | | L2T Modified |
|---|---|---|---|
| océano (ocean) | oh'SEH'ah'noh | --> | oh'SAY'ah'noh |

In the above example, the use of SAY, rather than SEH, provides a familiar letter-group that serves as a visual anchor in the transliteration.

Diphthongs initially are transcribed according to previously outlined procedures for sound-symbols. However, in Spanish, diphthongs generally consist of blended sounds (unless one of the vowels is accented). In transliterations that require the blending of vowel sounds, it is preferred that the apostrophe be deleted. The insertion of a visual divider (such as the apostrophe) causes readers to separate, rather than blend sounds, thereby evoking disjointed sound-streams. Therefore, in the present invention, the dual vowel-symbols normally are joined. Hence a typical example of a diphthong transliteration is:

| L2 | L2T | | L2T Modified |
|---|---|---|---|
| bien | bee'EHN | --> | beeEHN |

In certain cases, deletion of the apostrophe would evoke errors in pronunciation. For instance, in Spanish, the word traer (ENG: (bring)) would be transliterated as trahEHR. L1 language interference would cause the English speaker to pronounce the first H with a hard H sound. However, deleting the first H creates a tendency to pronounce the first 'syllable' "tra", as in the word "tray", rather than "trah". Therefore the apostrophe is inserted to separate the letter-groups. The resultant transliteration is: trah'EHR.

| L1 | L2 | | L2T |
|---|---|---|---|
| bring | trahEHR | --> | trah'EHR |

Letter-groups also are separated by apostrophes when there is equal stress on both syllables of the transliteration.

For instance, in the word "ceremonia", both sounds in the diphthong IA are non-stressed. Therefore, the standard transliteration would be "eeah". Since this letter-group is confusing, the letter-group is divided into two separate 'syllables'. Thus the final transliteration process would be "she'reh'MOH'nee'ah":

| L1 | L2 | | L2T |
|---|---|---|---|
| ceremony | ceremonia | --> | seh'reh'MOHN'ee'ah |

In certain languages, triphthongs frequently consist of only one or two vowel sounds. In some cases, one or two of the vowels may be silent. In other situations, vowel sounds may be blended in a manner that effects a new sound or sounds. In such cases, the rules governing single vowels and diphthongs are applied. For example, in the word "quien" (who), the sound of the U is silent. Thus the word is transcribed keeEHN or kee'EHN:

| L2 | | L2T (a) | | L2T (b) |
|---|---|---|---|---|
| quien | --> | keeEHN | or | kee'EHN |

In the above transliteration, the two syllables are joined, as in example (a) or separated by an apostrophe, as in example (b). This is possible because there is one stressed and one non-stressed sound, thus requiring capitalization of one syllable. Capitalization distinguishes between the separate sounds—the lower case and upper case letters provide an adequate visual indicator of the distinction.

Transliterations are further simplified by eliminating as many letters as possible without jeopardizing control of sound production. Normally this is accomplished by eliminating the letter H and/or by inserting a familiar L1 letter-group. For example, the final transliteration of "nosotros" (ENG: we) is no'SO'trohs:

| L2 | L2 T | L2T Modified |
|---|---|---|
| nosotros | noh'SOH'trohs | no'SO'trohs |

The final H is retained in the last letter-group since its deletion increases the likelihood of mispronouncing the vowel sound. Without the final H the reader might question: should the syllable "tros" be pronounced with the sound OH (post) or AH (roster)? Since the likelihood of creating user uncertainty is high, this modification is not applied to the last syllable.

Certain letter-combinations leave the user in doubt as to the nature of vowel sounds that should be produced. For instance, the transliteration of futbol (ENG: soccer) would normally be FOOT'bohl. However, the reader may question: should the syllable FOOT be pronounced as in the English word "foot" or, in accordance with the phonetic code for transliterations, as in the English word "food"? A modification is employed to clarify the sound-symbol. In this case, an additional O is added to the syllable, creating the letter-group FOOOT. This draws added attention to the syllable by lengthening it. It also evokes a literacy-based conditioned response to pronounce the letter-combination OOO as in the word too. Thus the modified transliteration is FOOOT'bohl.

| L2 | L2T | | L2T Modified |
|---|---|---|---|
| fútbol | FOOT'bohl | --> | FOOOT'bohl |

Certain letter-combinations leave the user in doubt as to the nature of consonant sounds that should be produced. For instance, should the syllable TEEG be pronounced with a soft or hard G? A modification is employed to clarify the sound-symbol. For instance, a standard transliteration for "antigua" (ENG: ancient) would be ahn'TEE'gwah. However to avoid using the unfamiliar letter-combination of gw, the G is attached to the preceding syllable, and the transliteration is modified to ahn'TEEG'wah. To clarify that the desired sound in the syllable TEEG is that of a hard G, an additional G is added to the end of the syllable. Thus the process of modifying the transliteration would include:

antigua→ahn'TEE'gooah→ahn'TEE'gwah→ahn'TEEG' wah→ahn'TEEGG'wah

In certain cases, the reverse of the above situations exists and appropriate modifications are made.

A problem in traditional transcriptions is the occurrence of syllables and letter-combinations that are alien to the L1. Although strongly preferred over International Phonetic Alphabet (IPA) transcriptions, traditional familiar-alphabet transcriptions still have the drawback of including excessive quantities of unconventional syllables and letter-groups that are incompatible with the norms of the L1. For instance, based on traditional methods for forming familiar-alphabet transcriptions, the Spanish word "despues" (ENG: afterward) would be transcribed "dehs-PWEHS" or "dehs-poo-EHS". The dominance of such visually disorienting letter-combinations frequently overwhelms aspiring speakers.

The visual disruption effected by letter-groups that are alien to the familiar language create numerous cognitive-processing problems for aspiring L2 speakers. However, such combinations frequently emerge in the process of transcribing words according to standard procedures of the phonetic transliteration system.

By contrast, certain L1 letter-groups are highly consistent with and familiar to a given language. For instance, in English, the letter-group "ess" is consistently pronounced as it would be in the words "dress" or "express". This type of 'syllable' serves as a visual anchor in the transliteration, since the reader's attention automatically is drawn to it. Utilization of such syllables serves to soften the impact of "strange" or more difficult letter-groups, thereby effecting a significant improvement in the user's pronunciation and level of confidence. Thus, visually familiar letter-groups are included in transliterations as frequently as possible. An added benefit of utilizing familiar letter-groups is that they can be incorporated without the need for including written instructions relative to their pronunciation.

The present system for modifying transliterations capitalizes on the user's inherent tendency to read certain letter-combinations as if they were written in the user's familiar language. For example, referring to the aforementioned example, the word "después", typically transcribed as "dehs-poo-EHS", when modified becomes "desp'WESS". Similarly, the Spanish word "cuenta" (ENG: check), is initially transcribed as "coo-EHN-tah". However, after applying modification rules, the transliteration is "QUENT'ah".

Transliterations that include unfamiliar letter-groups often are reconstructed to minimize or eliminate elements that are alien to the L1. It is preferred that, when possible, modifications be applied in a manner such that alien letter-patterns are deleted and replaced with L1-familiar syllables.

Examples of modified transliterations include:

| L2 | L2T | | L2T Modified |
|---|---|---|---|
| después (after) | dehs'pooEHS | --> | desp'WESS |
| impuesto (tax) | eem'PWEHS'toh | --> | eemp'WEST'o |
| cuanto (how much) | QUAN'toh | --> | QUAN'toh |
| refresco (drink) | reh'FREHS'co | --> | reH'FRESS'co |
| recto (straight) | rehk'toh | --> | RECK'toh |
| trescientos (300) | treh'see'EHN'tohs | --> | tressy'EHN'tohs |
| exito (success) | EHK'see'toh | --> | EX'ee'toh |
| exportar (explore) | ehks'pohr'TAHR | --> | ex'por'TAR |
| martes (Tuesday) | MAHR'tehs | --> | MART'ess |
| desconectar (disconnect) | dehs'coh'nehk'TAHR | --> | dess'co'neck'TAR |
| arquitecto (architect) | ahr'kee'TEHK'toh | --> | arky'TECT'o |

In traditional systems, some sounds are represented by consonant combinations that are alien to the L1 reader. For instance, the letter-combinations kw, bw, gw, dw, and pw are disconcerting to the English reader. In the present embodiment, for words in which these consonant-combinations are indicated, the preferred modification is to attach the first consonant to the end of the previous syllable. For example:

| L2 | | L2T | | L2T Modified |
|---|---|---|---|---|
| agua (water) | --> | AH'gwah | --> | AHG'wah |

For words that begin with one of the above mentioned sounds, other solutions are required. If possible, a familiar L1 letter-group is used, as in the following example:

| L2 | L2T | | L2T Modified |
|---|---|---|---|
| cual (which) | cooAHL | --> | QUALL |

The user's tendency is to emphasize a syllable that is longer than other syllables in the transliteration, regardless of the inclusion of contraindicators (i.e. explicit instructions, use of capital letters, etc.) To compensate for this tendency, certain transliterations are modified by lengthening a stressed syllable to increase its visual impact. By adding visual "weight" to a letter-group, the reader's tendencies regarding syllabic stress subconsciously migrate toward the longer syllable. For example:

| L2 | L2T | | L2T Modified |
|---|---|---|---|
| fácil (easy) | FAH'seel | --> | FAHH'seel |

Insertion of the overwise superfluous H, as in the latter transliteration, increases the probability that the user will stress the first syllable, thereby overcoming the inherent tendency to incorrectly pronounce the word with an emphasis on the second syllable.

A transliteration may also be modified by shortening a non-stressed syllable. This is particularly important when the accented syllable should be heavily stressed. For example:

| L2 | L2T | | L2T Modified |
|---|---|---|---|
| cómo (how) | COH'moh | --> | COH'mo |

A transliteration also may be modified by shortening a non-stressed syllable and lengthening the stressed syllable. For example:

| L2 | L2T | | L2T Modified |
|---|---|---|---|
| mucho (much) | MOO'choh | --> | MOOCH'o |

Users tend to pronounce words with more fluidity and natural variation in cadence when transliterations are constructed with varied letter-group lengths. In other words, transliterations that normally would be written in multiple three-letter syllables/groups (i.e. xxx'xxx'xxx'xxx') may be reconstructed to provide an offsetting visual cadence (i.e. xxxx'xx'xxxx'xx, xx'xxxx'xx, etc.). Modifying transliterations to accommodate this tendency also provides improved visual anchoring. For example:

| L2 | L2T | | L2T Modified |
|---|---|---|---|
| vitamina (vitamin) | vee'tah'MEE'nah | --> | veet'ah'MEEN'ah |

It is preferred that each transliteration contain at least one familiar syllable or letter-group. For transliterations containing three or more syllables, inclusion of additional familiar letter-groups is preferred. This provides the user with visual and psychological anchors or baselines from which to begin cognitive processing tasks. Thus, in the present invention, numerous modifications are applied to transliterations to provide baselines from which the user can operate more effectively. For example:

| L2 | L2T | | L2T Modified |
|---|---|---|---|
| gustar (pleases) | goos'tahr | --> | goo'STAR |

| L2 | L2T | | L2T Modified |
|---|---|---|---|
| tal vez (perhaps) | tahl vehs | --> | tall vess |

Single-syllable L1 words are frequently incorporated as modifications. These serve as visual anchors for the user, allowing the user to glance quickly at these syllables, assess their simplicity, and then focus on the more challenging letter-combinations of the entry. Single-syllable L1 words are incorporated as frequently as possible. For example:

| L2 | L2T | | L2T Modified |
|---|---|---|---|
| cuarto (quarter, room) | KWAHR'toh | --> | QUART'o |
| horno (oven) | ORH'noh | --> | OR'no |
| yardah (yard) | YAHR'dah | --> | YARD'ah |
| juguete (toy) | hoo'geh'teh | --> | hoo'GET'eh |

Speakers tend to vocalize sounds of transcriptions or transliterations based on cognitive precedent. For instance, when attempting to vocalize the word for "repeat" (SPANISH: repetir), the speaker has a strong tendency to pronounce the first syllable "ree", as in "reed" (or repeat), rather than "reh", as in "red". However, the reverse is true of the word "restaurant" (SPAN: restaurante). The English reader's tendency is to pronounce the first syllable "reh" as in "red", which is also the correct sound for the Spanish word. It is presumed that when the L1 and L2 words are similar in spelling, L1 interference tends to control the cognitive perspective of the speaker. This facilitates or hinders vocalization, depending on whether the L1 and L2 words should be pronounced similarly or differently.

When the sounds of the L1 and L2 words conflict, graphic cues are inserted in transliterations to compensate for the disparity. In the above example, the letter h in the syllable "reh" is capitalized, resulting in the letter-group to "reH". This unconventional inclusion of a capital letter is intended to attract the reader's attention, causing the reader to pause and recall the phonetic rule that should be applied. Thus the modification process is:

| L2 | L2T | | L2T Modified |
|---|---|---|---|
| repetir (after) | reh'peh'TEER | --> | reH'peh'TEER |

The above method may be employed conversely if the problematic letter-group is stressed. For example:

| L2 | L2T | | L2T Modified |
|---|---|---|---|
| contra (against) | COHN'trah | --> | COhN'trah |

Cognates and false cognates also elicit language interference, thereby strongly impacting the speaker's tendencies to pronounce syllables according to L1 conditioning rather than the rules of the L2 phonetic system. For instance, the English speaker tends to pronounce the first syllable of the word "tráfico" (ENG: traffic), "tra" as in the English word "at" rather than "trah" using the AH sound. To counteract this tendency, the word is modified as follows:

| L2 | L2T | --> | L2T Modified |
|---|---|---|---|
| tráfico (traffic) | TRAH'fee'coh | | TRAHH'fee'co |

Certain L2 words (or syllables of words) are pronounced similarly to their L1 equivalents. In many cases, transliterating them is best accomplished by leaving them in the native language. This leverages L1 knowledge, thereby simplifying cognitive-processing tasks. For instance, except for the final syllables, the word profession is pronounced (essentially) the same in both Spanish and English. In such cases, the section of the word that corresponds to the English equivalent is left in tact—only the segments of the L2 word that differ from the L1 equivalent are transliterated. "Read-As-ENGLISH" segments of transliterations may be italicized to distinguish them from phonetically transliterated letter-groups. For example:

| L2 | L2T | --> | L2T Modified |
|---|---|---|---|
| profession (profession) | proh'feh'see'OHN | | profess'ee'OHN |

In other cases, English letter-groups and words are utilized to modify transliterations. For example:

| L2 | L2T | --> | L2T Modified |
|---|---|---|---|
| exterior (exterior) | ehks'teh'ree'OHR | | ex'terry'OR |

In some cases, L1 words are used for a combination of reasons. In the following transliteration the English word HEMP is incorporated to effect simplification, shortening, varying cadence, anchoring, and L1 leveraging:

| L2 | L2T | --> | L2T Modified |
|---|---|---|---|
| ejemplo (example) | eh'HEHM'ploh | | eh'HEMP'loh |

Certain letter patterns are familiar and comfortable to L1 users for a variety of reasons, including repeated cultural exposure and psychological association with concepts of simplicity. Examples of such cases include:

| L2 | L2T | | L2T Modified |
|---|---|---|---|
| muy (very) | MOO'ee | --> | MOOey |
| buscar (look for) | boos'CAHR | --> | boos'CAR |

In some words, the presence of a diphthong or triphthong creates a sound which may be better represented by using one of the above modifications:

| L2 | L2T | | L2T Modified |
|---|---|---|---|
| sueldo (salary) | sooEHL'doh | --> | SWELL'doh |
| suéter (sweater) | sooEH'tehr | --> | SWAY'tehr |

Certain seemingly beneficial modifications are avoided due to dialectic variations. For instance, the standard transliteration of "opinion" is oh'pee'neeOHN. The transliteration is not modified to oh'pee'neeON (eliminating the h of the last syllable). The syllable 'ON' also represents a commonly used word that is pronounced differently by persons of diverse regional and ethnic backgrounds. Therefore, the modification is not applied.

In certain instances, a modification utilizing a familiar letter-group may be phonologically appropriate, but the syllable may create confusion for certain users. For instance, the word "contra" (ENG: against) could be represented as CONE'trah. However, users who have developed a habit of strictly adhering to phonetic vowel-sound production might be confused by the appearance of the letter E, wondering whether it should be pronounced COH'NEH (according to the phonetic system) or CONE (as the English word). Generally, applications that cultivate ambiguity are rejected, and the standard transliteration is utilized.

In some situations, there are options regarding the symbolization of a specific letter. For instance, in English transliterations, the Spanish letter C may be symbolized using a K or C. Determinations regarding the preferred letter-symbol are contingent on literacy biases and cultural conditioning. However, such decisions generally are made to leverage or compensate for literacy biases.

If the desired sound of the L2 syllable is comparable to that of a commonly used L1 word, it is preferred that the transliteration be formed using the letter-symbols that are present in the L1 word. For instance, the Spanish word "carta" (ENG: letter), is reminiscent of the English words "car" and "cart". Since both of these words are pronounced with vowel sounds that are comparable to the desired sound for the Spanish word, the transliteration is formed in a manner that capitalizes on the L1 bias. Thus the transliteration is produced as CAR'tah.

However, the reverse is also true. If the desired sound of the L2 syllable is different from that of a commonly used L1 word, the transliteration is formed using letter-symbols that contrast those used in the L1 word. For instance, when pronouncing the word "cambio" (ENG: change), the reader's tendency is to incorrectly pronounce the syllable "CAM" as in the English word "camp". To counteract this tendency, the syllable is written using the letters "KAHM", producing the transliteration KAHM'bee'o. Since there are virtually no English words that begin with the letters KAH, the reader's L1 bias is curtailed. This causes the user to consciously reconsider elements of the phonetic system, rather than depend on an automatic response. Thus there is an increased likelihood that the reader will pronounce the syllable correctly.

In the word-specific transliteration system of the present embodiment, there are certain situations in which standard modifications are not applied. For instance, modifications are not applied to letter-groups in which deletions are likely to significantly increase the probability of mispronouncing vowel sounds. For example, according to standard procedures, the transliteration for "hablar" (ENG: to speak) would be ah'BLAHR. Applying the above mentioned modifications would condense the transliteration to a'blar. Incorporating this modification would retard cognitive processing by evoking questions such as: Should the first vowel be pronounced AH, as in "father", or A, as in "day"? Should the second vowel be pronounced AH, as in "father", or A, as in "blare"? Since incorporating the modification is likely to create significant uncertainties for the user, neither modification is applied.

Provision of a highly efficient data-accessing system is central to the effectiveness of the language system since users may be operating in rapid-paced conversational interactions.

The data-accessing pace is strongly impacted by the format of graphic displays. Ease of use and speed of accessing are negatively impacted by unnecessary eye movements, excessive requirements for hand operations, and obstacles to cognitive processing. Therefore, in addition to traditional logic relative to production of visual aids, execution of the invention requires additional considerations.

It is an object of the present invention to present data in a format that enables the user to visually access a large quantity of entries rapidly, preferably within two to ten seconds per entry, with minimal eye movement and manipulation of the physical device's components. Toward this end, certain strategies and measures are implemented to provide graphic continuity and uniformity and to enhance visual distinctions.

In general, acceleration of word-accessing is achieved by reducing counterproductive manual operations and visual scanning. This is accomplished, in part, by:

1. limiting the number of hand operations;
2. reducing the complexity of hand operations;
3. eliminating linguistic obstacles to cognitive processing;
5. establishing visual continuity in graphics; and
4. minimizing visual clutter.

Words and phrases are displayed within the context of a graphic framework that serves as a flowchart for the sentence-formulation process. In the graphic format of preferred embodiments, categories of data are displayed within the confines of easily distinguishable boundaries: those which are created by device foldlines. Alternative embodiments may be required for other languages.

A primary strategy for enhancing instant-accessing is that of displaying L1 data in a uniform pattern that facilitates visual identification of words and phrases. In preferred embodiments of the present invention, said pattern comprises inclusion of white space between the entries of headwords and visually linking L1 headwords with L2 equivalents by applying graphic enhancements (i.e. bolding, color-coding, italics) to both entries.

The inclusion of white space above and below L1 headwords substantially accelerates the process of visual scanning and provides an added element of visual continuity for L2 entries. Uniformly incorporating white space also enhances the sense of structure created by the visual framework, thereby imparting a subconscious impression of order and simplicity.

It is preferred that each set of lexical entries occupy not more than 2 column lines, as shown in FIG. 2. This creates a continuous column of L1 headwords (on the left) that are separated by white space above and below each entry. Implementation of the above measures provides visual continuity and cohesiveness, thereby facilitating eye movement and effecting improved psychological receptivity.

General needs relative to column formats are identified after initial selections of words and phrases have been determined. Said formats are then modified to conform to spatial restrictions of specific sections or pages. Subsequently, text is edited and sized to fit the available column space.

Column width is impacted primarily by the number of characters per inch required to present the majority of entries within a given section, particularly L2 transliterations. Typically, transliterations comprise the most lengthy of the three entries, thus consuming the most space per column line. It is preferred that column widths be adequate to accommodate entries without hyphenating and continuing entries on following lines, since hyphenated words and transliterations obstruct visual continuity and retard cognitive processing.

Column width, and therefore number of columns per section or page, is also impacted by language-specific idiosyncracies. For instance in Spanish, first person plural verb conjugations are longer than first person singular conjugations. Therefore, decisions relative to column width are based on the group of longer entries.

In the present invention, sections and pages of the device generally include two to four columns each, depending on the categorization and spatial requirements of linguistic content. There are approximately 28–32 lines per column, (depending on space requirements for titles and pronunciation indicia), yielding an average of 14–16 entries per column.

A balance between the characters-per-line allotted to L1 and L2 entries is established to allow for justifying dual-column entries. Columns of L1 entries are left justified. For displays in which L2 entries are placed to the right of L1 entries, it is preferred that L2 entries be justified at mid-column or slightly to right of L1 entries, as in the case of Numbers. The actual position of this point is contingent on the length of the majority of L1 entries.

Display models are designed to support multiple strategies required for converting an L1 to an L2. Development of models is translation-specific. As such, models may be modified, depending on the direction of the conversion. For instance, models for the English to Spanish conversion may be different from those required for converting Spanish to English. Preferred models for the English to Spanish system, as shown in FIGS. 2, numbers 4, 5, 6, and 7, are:

| L1 Headword/Phrase | L2 Equivalent |
| | L2 Transliteration |
| L1 Headword/Phrase | L2 Equivalent |
| (NOTATION) | L2 Transliteration |

If lexical items cannot be clearly and efficiently presented as indicated in the above model, alternative models are used, as in the case of Questions and Responses. A preferred model for this category, as shown in FIG. 2, numbers 9 and 10, is:

| L1 Key Word Label | L1 Question | L1 Response |
| | L2 Equivalent | L2 Equivalent |
| | L2 Transliteration | L2 Transliteration |
| L1 Key Word Label | L1 Question | L1 Response |
| | L2 Equivalent | L2 Equivalent |
| | L2 Transliteration | L2 Transliteration |

The role of graphic features significantly exceeds that of cosmetic or psychological appeal. Graphics applications serve to enhance visual components that support fluidity of scanning, speech production and cognitive processing.

For instance, the elements of font size and the length of words and phrases combine to impact the number of entries that can be displayed in a particular column. The length of the majority of words to be displayed in a column dictates column width. In turn, column width is a determining factor in the number of columns that can be presented on a section or page. The number of columns combined with the number of lines-per-column impact the number of possible entries-per-page or section.

Thus, in the present embodiment (in which most displays are printed at 7.5–8 pt.), a minor increase in font size may effect a substantial loss of entries in the overall system. However, salvaging entries by reducing font size may reduce legibility. Therefore, it is preferred that font styles be simple and font sizes sufficient to accommodate the needs of an average consumer who is reading in a variety of environments (i.e. dimly lit restaurants, glaring sun, etc.).

It is preferred that L1 headwords and L2 equivalents be visually linked, by use of bold letters, common colors, italics, etc. This facilitates the process of visual scanning and simplifies the process of maintaining entries in peripheral vision while the user refers to additional data located in another area of the device.

Varying colors also are used to distinguish discrete sections. This is accomplished by color-coding either the titles of sections or the entire body of entries in the section.

Underlining may be used in transliterations to offset discrete letters, letter combinations, syllables or words. This serves to highlight varied aspects of syllabic stress or other elements relative to pronunciation.

Conformity to the above models for displaying entries requires extensive editing, sizing and modifications in word and phrase selections. For example, it is strongly preferred that transliterations be displayed on one line, without hyphenating and continuing them on subsequent lines. However, in the present embodiment, many transliterations occupy up to 50% more linear space than do their respective L2 equivalents, causing them to exceed the limitations of the column line. Measures are implemented to compensate for the excessive length of certain entries. These measures include:

1. The 'spelling' of the transliteration may be modified;
2. An alternative L2 word, that has a shorter transliteration, may be substituted;
3. Certain entries may be reduced in length by reducing the letter-spacing of the word/phrase;
4. Column width may be increased slightly, by borrowing space from adjacent columns;
5. If the problematic entry is a noun, the gender notation (m. or f.) may be deleted;
6. The transliteration may be continued on the next line; and
7. The entire entry may be deleted.

In certain situations, notations are used to specify headword functions or define more explicitly their meanings or uses. Such notations should be incorporated minimally. Displaying notations below or next to the L1 Headword entry creates visual obstructions and destroys the impact of white space, causing L1 headwords to appear to be "lost" in the visual confusion. This hinders the user's ability to visually isolate words. When required, notations should consist of not more than two words.

It is preferred that notations be limited to the number of character spaces available on one line. To distinguish them from general text, notations may be displayed next to or below headwords and italicized, placed in parentheses, and inset (from column left) by 1–2 spaces.

Decisions regarding the number of notations to be included in a particular column are contingent on the visual complexity and "weight" of the L1 column and page or section. A column that has 5–6 notations is considered cluttered. Thus, it is preferred that a particular column contain not more than 5 notations.

Pronunciation boxes are prominently displayed in various areas of the device. Each box and its contents are visually distinguished from the main body of text by offsetting graphics such as bolding, colors, distinctive spacing, italics, and/or other graphic enhancements. To reduce eye movement, pronunciation boxes in the present invention are strategically positioned in the upper-left and upper-right corners of most display panels and in the lower-left and lower-right corners of the panel above the general lexical assembly. This creates a framework in which the distance between transliterations and pronunciation data is not more than eight inches. Thus the user may glance to pronunciation data while still holding the transliteration in peripheral vision. This eliminates the problem of losing the word while referring to pronunciation information.

Carrying out the invention in alternative embodiments and other languages entails implementation of these steps to achieve uniformity and continuity in the visual display.

To effectively utilize the present device, the user's primary task is to recall locations of words rather than the words themselves. In the present invention, this requires learning 2 general locations of data rather than memorizing approximately 2000 words and phrases. The task is further simplified in that the word-groups for sentence structuring are functionally categorized and sequentially displayed.

From a consumer's perspective, utilization of the present invention is very simple. Data is presented in a format that is predominantly self-explanatory and in which instructions are implicit in the graphic layout of lexical groups and their respective category labels. The format and design of the present system cultivate subconscious impressions relative to the level of simplicity at which sentences should be formulated.

Additionally, the configuration and process of the present invention is more flexible than those of traditional linear presentations. The syntactic infrastructure is intentionally passive, providing visual cues and parameters that subconsciously guide the speaker through sentence construction. However, the layout is designed for a suggested, as opposed to compulsory, sentence pattern, encouraging advanced speakers to explore new linguistic approaches.

To formulate original sentences the user needs only the simple instructions to, "Work in a clockwise direction", identifying and vocalizing words as the user proceeds through the categorical displays of words. Although other sequences may be used, this pattern is preferred since it is universally familiar, conveys a sense of linguistic organization and progression without imposing an overly restrictive syntactic structure, visually leads the user back to the Responses the user may hear from the L2 speaker, and creates a subconscious sense of cyclical activity, thereby encouraging the user to repeat the process and remain engaged in the conversation.

To utilize the invention, the user lifts the right edge of the device's cover and lowers it toward the left. When positioned, as shown in FIG. 2, data relative to the communication of certain predefined phrases is visible.

Initially, the user is advised to briefly review the entire display of predefined phrases and become familiar with the layout of the system. The user is subsequently instructed to perform the following tasks. If the user has adequate knowledge of L2 pronunciation, the user is instructed to follow only the instructions outlined in steps 1–4.

1. Review the categories and contents of the columns
2. Select an L1 word/phrase
3. Shift vision to the right of (or below) the L1 word/phrase, to identify the L2 equivalent.
4. Shift vision to the L2 transliteration, which is below or to the right of the L2 equivalent.
5. Review the transliteration, taking particular note of vowel sounds.
6. Shift vision to a Pronunciation Box, at the top of the display area.
7. Review pronunciations for vowel sounds.
8. Shift vision back to the selected L2 transliteration.
9. Apply the vowel sounds (as indicated in the Pronunciation box) to the individual syllables of the transliteration.
10. Pronounce the groups of transliteration letters that are capitalized, remembering that the syllables will be stressed in the pronunciation.
11. Read and pronounce the transliteration.

To utilize the present invention for creating original sentences, the user raises the bottom edge of the uppermost primary display surface, lifting it upward and back. When the present device is properly positioned, as shown in FIG. 3, data relative to original communications is visible.

Prior to formulating a sentence, the user is advised to review the category labeled Responses 16. In the present invention, this category is located in the first column of the original communication system. This section contains words and phrases that may be used for replying to a statement or question. The purpose of advance review of the category is to familiarize the user with remarks that may be heard after verbalizing a sentence.

The user is then instructed to select and verbalize words according to the 11-step process described above. However, to present discrete words and phrases in a syntactically suitable manner, the user is advised to follow the instructions below.

First, the user scans, in a clockwise direction, the categories and contents of the sections. To create a sentence, the user sequentially selects a word from each of 2 or more of the four sections: Sentence Starters 17, Action Words 22, Support Words 25, and the A–Z lexicon 30. For instance, when asked to create the statement, "She is my friend," the user refers to the upper-left section 12, where the user finds a category of words labeled "Subjects" 19. Under this heading, the user locates the word "She" 41. Across from, and to the right of the L1 entry, the user finds the L2 equivalent of the word. Directly below this word is the transliteration for the L2 word or phrase. After pronouncing the phonemes (EH'yah) for the word "She", the user shifts vision to the upper-right section 13, which is labeled "Action Words" (verbs) 22. The user scans the tab-indexed labels for verbs and locates the section for third person singular verbs. The user lifts the uppermost sheets upward and back from the section labeled "You/He/She/It" 23c, thereby revealing the double-page layout of verbs conjugated appropriately for the subject "she". The user locates the entry for "is" 42 and reads the transliteration (EHS). After pronouncing this phoneme, the user shifts gaze to the lower-right section 14, to view "Support Words" 25. The user locates the word "my" 43 and reads the L2 transliteration (MEE). The user then shifts gaze to the lower-left section 15, scans the tab-indexed labels and locates the letter "F" 28. The user lifts the uppermost sheets upward and back from the section labeled "F", thereby revealing the double-page layout of entries that begin with the letter "F". The user locates the L1 entry for "friend" 44 and reads the L2 transliteration (ah'MEE'go), thereby completing the sentence.

Figure 6:
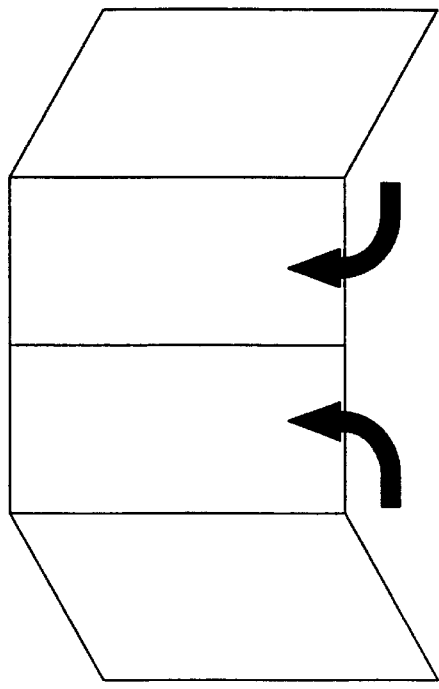
FIG. 6 is a perspective view of an alternative embodiment of the device.
Figure 8:
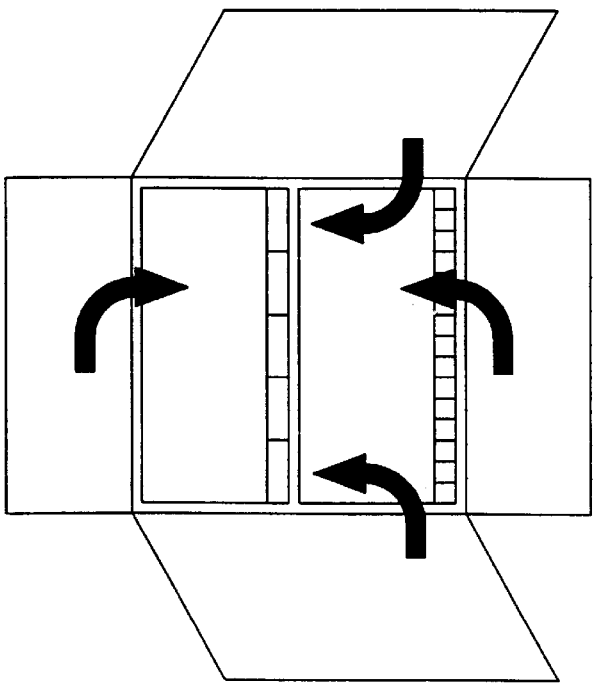
FIG. 8 is a perspective view of an alternative embodiment of the device.

To create a question, the process is similar. For instance, to create the question, "When does the ferry leave?" the user is instructed to delete auxiliary verbs (such as does) and reframe the sentence according to sequential placement of categories. Thus, the revised sentence structure is "When leave the ferry?" To create this sentence, the user refers to the upper-left panel 12, where the user finds a category of words labeled "Question Words" 18. Under this heading, the user finds the word "Where" 45. Across from, and to the right of the English entry, the user finds the Spanish equivalent of the word. Directly below this word is the transliteration for the L2 word or phrase. After pronouncing the phonemes DOHN'deh (for "Where"), the user shifts gaze to the upper-right panel 13, which is labeled "Action Words" (verbs) 22. The user scans the tab-indexed labels and locates the section for third person singular verbs. The user lifts the uppermost sheets upward and back from the section labeled "You/He/She/It" 23c, thereby revealing the double-page layout of verbs conjugated appropriately for the subject "it". The user locates the entry for "leave" 46 and reads the L2 transliteration (sah'LEER). After pronouncing these phonemes, the user shifts gaze to the lower-right section 14, to view "Support Words" 25. The user locates the word "the" 47 and reads the L2 transliteration (lah). The user then shifts gaze to the lower-left panel 15, referring to the A–Z lexical assembly 30. The user scans the tab-indexed labels and locates the letter "F" 28. The user lifts the uppermost sheets upward and back from the section labeled "F", thereby revealing the double-page layout (FIG. 6) of entries that begin with the letter "F". The user locates the L1 entry for "ferry" 48 and reads the L2 transliteration (ah'MEE'go), thereby completing the sentence.

Thus to create a simple sentence, the user is simply instructed to "work clockwise", sequentially selecting and pronouncing words from appropriate sections of the Sentence Generator. Instruction sheets may indicate numeric values for each section. For instance, the first (upper-left) section is #1; the upper-right section is #2; the lower-right section is #3; and the lower-left section is #4. Therefore, formulating a sentence utilizing the selected syntax typically effects a numbering sequence of 1,2,3,4. For instance, the section sequence for creating the sentence "He is my friend", would be: 1, 2, 3, 4.

| SEC: | Word | PRONUNCIATION |
|---|---|---|
| 1 | He | ehl |
| 2 | is | es |
| 3 | my | mee |
| 4 | friend | ah'MEE'go |

In certain cases, the user is instructed to reframe thoughts prior to attempting to verbalize the sentence. For instance, beginning speakers initially are instructed to ignore auxiliary verbs. Therefore, to convert to Spanish the English thought "We {are} going to the store", the speaker conceptually reframes the sentence to "We go to the store". Hence the word selection sequence is:

| SEC: | WORD | PRONUNCIATION |
|---|---|---|
| 1 | We | no'so'TROHS |
| 2 | go | EER |
| 3 | to | AH |
| 3 | the | LAH |
| 4 | store | teeEHN'dah |

To convert the question, "When does the airplane leave?", the sentence is reframed to "When leaves the airplane?". Hence, again the selection sequence is:

| SEC: | WORD | PRONUNCIATION |
|---|---|---|
| 1 | When | QUAN'doh |
| 2 | leaves | sah'LEER |
| 3 | the | EHL |
| 4 | airplane | ah'veeOHN |

To create negative sentences, the user is instructed to insert the word "NO" between words in sections 1 and 2.

STATEMENTS SECTIONS

EXAMPLE: This/is/too/expensive.→1, 2, 3, 4

EXAMPLE: This/is/NOT/too/expensive.→1, NO, 2, 3, 4

The dictionary is located in position 4, since the selected syntax accommodates extensive branching at this point in the sentence structure. For example:

| 1 2 3 | 4 | 4 | 4 | 4 |
|---|---|---|---|---|
| She is very | . . . nice. | . . . tall. | . . . rich. | . . . old. |

Incorporation of the clockwise pattern diminishes the impression of rigidity and encourages the user to create sentences using varied word sequencing patterns as the user acquires greater proficiency in the L2. The circular pattern also conveys a cyclical impression—since the process is designed to "end" at a place that immediately precedes the "Start" point.

By incorporating a non-linear method of displaying lexical categories, it can be presumed that users will quickly begin to recognize that the system can be used to create sentences using numerous syntactical patterns. This method is more flexible than those of traditional linear presentations.

The above format provides the syntactic support needed by the beginning speaker, and yet is unobtrusive and virtually transparent to the advanced speaker who may prefer to use more complex variations in syntax for sentence generation.

Additional instructions for formulating sentences using alternative sentence structures, information relative to points of grammar, etc. may be provided via various media. In the present invention, such information is included at the end of the A–Z lexical assembly.

In alternative embodiments, the sequencing of categories may be significantly modified. Standard reading patterns for certain languages (such as Hebrew and Chinese) do not incorporate left to right and/or top to bottom eye movements. Therefore, systems in which such languages are the L1 would be adapted to conform to the norms of the L1 culture. Therefore in alternative embodiments, sections and categories of the sentence generation system may be positioned such that sequencing begins at the top or bottom left, right, or center and reading left to right or right to left; up; down; or in a circular pattern.

To close the device, the user folds the primary surface vertically and then horizontally at the center fold-lines. In this orientation, the device is approximately 6 by 4½ inches, and may be conveniently stored in a purse or pocket.

It is a further object of the present invention to serve as a learning aid. In addition to previously mentioned aspects of learning enhancement, this is accomplished in part by incorporating measures and strategies that facilitate visual memory, simplify cognitive processing, and cultivate incidental learning. The physical device is designed for ease and enjoyment of use. This encourages more frequent and prolonged use of the present invention, thereby contributing to enhancement of learning.

The speaker typically begins to make a conscious effort to memorize certain words, particularly those which are easy to recall and are frequently used. The speaker develops a familiarity with or memorizes some words automatically, due to repeated exposure to the words. Thus L2 learning becomes a by-product of communication rather than a prerequisite for it.

The impression conveyed by the present device is more similar to that of a menu than a book and therefore can be associated with pleasant experiences. The device is small, compact, and presented in a user-friendly graphic style that minimizes eye movements and hand manipulations. The product image is non-intimidating and psychologically accessible, which increases the learner's receptivity to it.

In terms of content, virtually all data is relevant to the learner's perspective. In the present embodiment, the system is one-way, having no sections with "foreign" headword entries or introductory sections containing extraneous information. Thus, the number of words displayed is reduced and data of marginal benefit is eliminated, thereby effecting a learning environment that is characterized by clarity and simplicity.

Users of the present invention also experience instant gratification. The ability to immediately verbalize thoughts and to receive feedback increases the likelihood that the user will use the device more frequently and will sustain conversational interactions for a longer period of time. During these exchanges, the user will be mentally postured to assimilate various aspects of the L2 via direct acquisition processes.

Linguistic components are displayed in a manner that encourages review or study of data in brief increments of time. since learning is most significantly impacted during the beginning and the end of review sessions, learning is accelerated during these casual exposures to L2 data.

The present system is flexible, fulfilling the needs of learners at varying competency levels. For instance, the novice benefits from virtually all of the features of the present invention. However, as the learner progresses, the learner may rely on the device less heavily. For instance, the advanced user may not require support relative to syntax or certain categories of words. In these cases, the user automatically will eliminate searches for these known elements, and will use the present invention only for data that has not been mastered. At this point, the present invention serves primarily as a vocabulary prompter.

The present approach is multi-sensory and involves a high level of kinetic experiences. For the novice, the experience engages multi-sensory learning constantly since utilization of the system requires virtually continuous manipulation of the physical device.

The simplicity of the concept and design of the present invention encourages frequent and repeated use of the device, thereby increasing exposure to content. As a result, visual memory is engaged constantly during conversational interactions, thereby reinforcing learning.

Learning is positively impacted in situations in which multi-sensory memory processes are engaged. Visual, verbal and motor memory processes are activated as the speaker reads, speaks and manipulates pages of the device. Also, since the speaker is operating in dynamic and fluid settings, environmental and emotionally-charged cues are likely to accelerate learning of certain words or phrases. Furthermore the learner's assimilation of information is enhanced by repeated visual exposure to the same data, positioned at the same location in a display.

The need for repeated exposure to L2 data and experiences requires that students frequently utilize appropriate learning aids. Since learning is accelerated in positive social interactions, the present invention offers distinct advantages over reference books and electronic translators. The present invention provides relatively large displays of information in such a manner that the data may be easily viewed by two or more persons. This encourages cooperative efforts in effecting conversational exchanges. For instance, exchange students in a foreign restaurant setting can jointly use the device, collaborating in efforts to order meals or socialize with other customers.

The present invention cultivates cooperative involvement between L1 and L2 speakers. Word groups are displayed in a manner that makes it easy for L2 speakers to discern the organizational style. Therefore, the present invention can be viewed jointly by the foreign speaker and native speaker as they strive to establish communications.

The simplified style of presentation invites casual review of individual words or entire sections of the language system. The present invention is so easy to use that some individuals may exhibit a tendency to repeatedly pick it up and briefly review data by scanning certain categories. This is not possible with electronic translators, since the user must accurately key in each letter of a word or phrase every time the user wants to review it. For many students, this is a source of irritation that causes them to sharply curtail use of the electronic translator, thereby reducing learning opportunities. Furthermore, electronic devices offer no capabilities for retrieving and reviewing entire categories of words or phrases.

The present invention is particularly effective as a learning aid for individuals who are visually-oriented. Computer translators provide no fixed visual-aids, since displays of words are cleared after each usage. In contrast, the present invention provides permanent displays, some of which are constantly visible. This interjects in the learning experience a stabilizing influence that favorably impacts visual memory.

Computer translation systems do not fully engage the user. To maximize L2 learning, the speaker should be mentally engaged in the sentence-production process as fully as possible. Electronic translators exclude the user from L2-related tasks since the user's involvement is limited to keying in L1 data. This diminishes opportunities for learning. In contrast, users of the present invention are involved in each step of the communication processes.

The above description focuses on data delivery utilizing a hand-held paper-based device. However, the present translation system may also be presented via a variety of other media including computer programs, slides, posters, books, overhead-projection systems, video cassettes, laser disks, compact disks, transparencies, posters, flip charts, and the like.

The device as described herein may serve, within reasonable parameters, as a housing for translation systems for the majority of Indo-European languages. However, the design of the physical device is adapted to accommodate a single, language-specific system—for instance, English to Spanish. Therefore the device design for one translation system may vary from that of another. Device designs and translation-system designs are interdependent and therefore are constructed concurrently. The initial design of the device is produced with the objective of supporting rapid-access to a broad spectrum of components of a given translation system. Conversely, after effecting a device design that addresses the major objects of the translation system, components of the linguistic system are modified to conform to precise specifications of the delivery device.

Design modifications may be required to accommodate numerous variables inherent in creating translation systems for other target languages. For instance, the translation system of the current invention is considered the preferred embodiment for accomplishing major objectives of the English to Spanish translation system. However, if the target language were Chinese, significantly more space might be required to display words and phrases. This would impact lines per column and column width, thereby impacting the number of columns that could be printed in a single display area. Accommodating such linguistic variables might ultimately necessitate modifying the design of the device. Thus design modifications may be required even for systems of opposite translation directions (e.g. Spanish to English, versus English to Spanish).

In alternative embodiments of the present invention, sequential arrangements of categories are significantly modified. Standard reading patterns for certain languages (such as Hebrew and Chinese) do not incorporate left to right and top to bottom eye movements. Therefore, in alternative embodiments, sections and categories of the sentence generation system may be positioned such that sequencing begins at the top or bottom; left, right, or center; and reading left to right or right to left; up; down; or in patterns that correspond to particular shapes.

Figure 9:
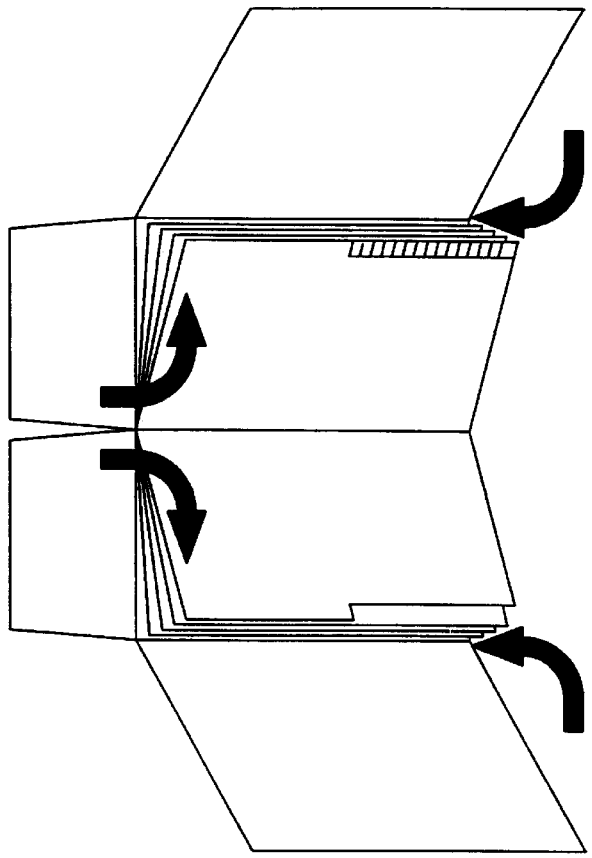
FIG. 9 is a perspective view of an alternate embodiment of the device.

For certain languages, alternative embodiments of the physical device may be required. These may include designs featuring bi-fold, tri-fold, or multi-fold formats (FIGS. 6, 7, 8, and 9) in which certain sections, words, and word groups as embodied in the present invention are displayed in a manner comparable to that of the present invention and/or in which one or more sections, words, and/or word groups are modified, repositioned, and/or displayed in alternative display formats, patterns, and/or sequences. In another embodiment, the language system is presented in the form of a book or booklet (FIG. 9) and may have panels that fold out or pull out from the covers.

In an alternative embodiment of the present invention, the device may be adapted to accommodate dual or multiple language systems, for instance English-to-Spanish and Spanish-to-English; or English-to-Spanish, English-to-French, and English-to-German.

The device also may be provided in alternative embodiments having no supplementary assemblies, fewer assemblies, or additional assemblies. The plural pages of the assemblies may be replaced by a single affixed or insertable sheet or card. An alternative embodiment also may have moveable, pull-out, fold out, extending, or extractable display surfaces (FIGS. 8 and 9) or may be otherwise designed to reveal information on an 'as needed' basis.

The present invention may be adapted to accommodate sound replication of words. This is executed in a manner that allows the user to activate an imbedded audio playback apparatus to listen to isolated sounds of the pronunciation system or discrete words and phrases.

An alternative embodiment of the present invention incorporates templates to facilitate learning words and phrases. The templates conceal certain aspects of data for the purpose of facilitating the review and memorization of L2 words. Templates may be made of paper, card stock or any other opaque material. Outer dimensions of templates correspond to the size of the primary display surface and contain die-cut openings that correspond to the standard column layouts for L1 entries. Therefore, when the template is in use, it covers the surface of the target sections, except for the L1 entries. Thus the learner does not need to recall the roster of L1 words that has been learned, and can more readily focus on the task of recalling the L2 equivalents.

In an alternative embodiment of the present invention, self-adhesive, removable tape or paper is used for temporary or long-term concealment of one or more columns of first- or second-language word displays, thus providing the user with a suggested method for reviewing or self-testing specific areas of interest.

In an alternate embodiment of the present invention, the primary display surface is produced with transparent pockets that are sized to fit a specific quadrant or section. When the user feels that the information provided in a given section of the standard data displays has been mastered, the user may continue to utilize the space allotted to that section by affixing a transparent pocket to the display area. Having executed this modification, the user will be able to utilize the pocket to display or store customized data cards quickly and easily by simply inserting or extracting the cards from the pocket(s) on an 'as needed' basis.

Self-adhesive or insertable cards may be provided for the purpose of customizing the present invention. Said cards are cut to fit within the borders of a quadrant (or primary display section) of the invention. These cards provide space on which the user can enter typed or hand-written L1 and/or L2 entries, colloquialisms, industry-specific words, notes on grammar, or other information. The cards can be affixed over the standard data displays. This enables the user to continue to maximize use of the physical device. For instance, the individual who has mastered the words in the standard data display may continue to utilize the allotted space by affixing to it customized display cards. This allows the user to gain extended use of the product.

The physical device may be adapted for numerous non-linguistic applications, particularly those in which instant access to multiple aspects of data would be beneficial. For instance, the device or modifications of the device can be adapted to provide a referencing system for standard responses in sales, marketing, or customer service environments. It may also be of benefit in other education or training environments, such as learning computer functions, medical data, etc.

The present invention fills multiple, diverse needs relative to communicating in a foreign language. First, L2 memory-dependence is replaced by provision of a rapid-access, system-based approach to supporting communication. Thus, the task of the aspiring speaker is not that of memorizing words and rules, but of becoming familiar with and comprehending the mechanics of the lexical-accessing, syntactic, and pronunciation systems. Initially, the memorization task is limited to that of recalling locations of categories of familiar-language (L1) words. The comprehension tasks are those of understanding simple instructions relative to procedures for original-sentence generation and application of pronunciation guidelines to phonetic transliterations.

In the present invention, several key aspects of translation needs are addressed via methods that are system-oriented, rather than instructive in nature. The need for memorized vocabulary is replaced or supplemented by a method for rapidly accessing words and phrases. The need for knowledge of syntax is replaced by a visual framework that is functionally categorized. This framework doubles as a flow chart for the sentence-structuring process. Clarification of grammatical variations between languages is provided by brief (one or two word) notations and by implication of sequential placement—i.e. the word's position in the sequentially-aligned syntactic framework. Semantic clarifications are provided by brief (one to two word) annotations or examples of usage. The need for L2 pronunciation skills is replaced by a novel speech-production system that is phonetically-oriented and based on L1-literacy conditioning. Exposure to irregular phrases is accommodated by providing categorized groups of phrases in an instant-access environment. Grammatical guidance is provided implicitly (via the word's positioning in the syntactic process) and by brief annotations or examples of usage. The need for knowledge relative to conjugating verbs is replaced by a novel instant-accessing system specifically designed for retrieval of conjugated verbs.

Thus the invention fills a longstanding void in L2 communications by providing a single resource that provides solutions which traditionally have been available only by referring to multiple resources, such as lexical dictionaries, phrase books, verb dictionaries and electronic translators.

Through a combination of active and passive exposures, the user may enjoy increased L2 proficiency as a by-product of communicating with native speakers in real-life settings.

While the invention has been described with reference to specific embodiments, modifications and variations of the invention may be constructed without departing from the scope of the invention, which is defined in the following claims.

I claim:

1. A translation and sentence generation system comprising a sentence starters section, a noun section, an action words section, a support words section and an expanded lexical data section, wherein the sections are arranged such that a user sequentially proceeds from the sentence starters section to the action words sections, to the support words section and to the expanded lexical data section when generating sentences, with a responses section positioned for reference prior to the sentence starters section or after the expanded lexical data section.

2. The system of claim 1, further comprising a predefined phrase section arranged such that the user views the predefined phrase section prior to or after viewing the noun and action words sections, wherein the predefined phrase section further comprises lists of commonly used expressions and lead-in phrases, and wherein each expression and phrase in each list has a first language entry, a second language equivalent of the first language entry and a transliteration of the second language equivalent.

3. The system of claim 2, wherein the lists of commonly used expressions and lead-in phrases further comprise a first list of greetings, a second list of goodbyes, a third list of courtesy statements, a fourth list of forms of address, a fifth list of frequently asked questions and a sixth list of lead-in phrases commonly used in response to the frequently asked questions of the fifth list.

4. The system of claim 1, further comprising at least one pronunciation key included in at least one section, wherein the at least one pronunciation key further comprises a first row of first language vowels, a second row of second language equivalents to the first language vowels, a third row of transliterations of the second language equivalents, and a fourth row having a linguistic mnemonic sentence.

5. The system of claim 1, further comprises a list of verbs and infinitives in the action words section with multiple lists of verbs categorized according to tense, person and number, wherein each list is provided on a separate page, wherein each page further comprises a tab for indicating contents of the page, and wherein the tabs extending from the pages are staggered for facilitating user identification and selection.

6. The system of claim 1, wherein the responses section further comprises a list of words and phrases commonly heard in response to questions, wherein the sentence starters section further comprises a question words subsection having a list of interrogatives and a subjects subsection having a list of words frequently used to begin sentences, wherein the action words section further comprises a list of verbs or infinitives, wherein the support words section further comprises a list of words and phrases of various parts of speech including adverbs, adjectives, prepositions, pronouns and conjunctions, wherein the expanded lexical data section further comprises a list of commonly used words and phrases, and wherein each word and phrase in each list has a first language entry, a second language equivalent of the first language entry and a transliteration of the second language equivalent, and wherein the words and phrases in the list in the expanded lexical data section are classified in categories, wherein the categories of words and phrases of expanded lexical data section are arranged in alphabetical order, and further comprising multiple letter-specific pages with the words and phrases on each page beginning with a particular letter, lettered tabs extending from each page for indicating contents of each page, and word tags extending from selected pages for indicating the categories, and wherein the lettered tabs are staggered and the word tags are staggered for facilitating user identification and selection.

7. The system of claim 6, further comprising a column wherein each first language entry is positioned at a left hand side of the column, the second language equivalent of the first language entry is positioned on a same line as the first language entry and to the right of the first language entry, and the transliteration of the second language equivalent is positioned directly beneath the second language equivalent.

8. An apparatus for language translation and sentence generation comprising a blank having a first panel, a second panel, a third panel and a fourth panel, with each panel being of generally the same configuration and dimension and having a front surface, a back surface and side edges, wherein the panels are interconnected such that in a closed orientation the first panel overlies the fourth panel to form a first panel combination, the second panel overlies the third panel to form a second panel combination, and the first combination overlies the second combination, and further comprising a predefined phrase directory provided on the back surface of the first panel and the back surface of the second panel, a sentence starters directory provided on the front surface of the first panel, an action words directory provided on the front surface of the second panel, a support words directory provided on the front surface of the third panel, and an expanded lexical data directory provided on the front surface of the fourth panel.

9. The apparatus of claim 8, wherein the blank is made of a semi-flexible material selected from the group consisting of paper, paperboard, card stock, vinyl, plastic, laminated paper and combinations thereof.

10. The apparatus of claim 8, wherein the predefined phrase directory further comprises lists of commonly used expressions and lead-in phrases, and wherein each expression and phrase in each list has a first language entry, a second language equivalent of the first language entry and a transliteration of the second language equivalent.

11. The apparatus of claim 10, wherein the lists of commonly used expressions and lead-in phrases further comprise a first list of greetings, a second list of goodbyes, a third list of courtesy statements, a fourth list of forms of address, a fifth list of frequently asked questions and a sixth list of lead-in phrases commonly used in response to the frequently asked questions of the fifth list, and wherein the first, second and third lists are provided on the back surface of the first panel and the fourth and fifth lists are provided on the back surface of the second panel.

12. The apparatus of claim 8, wherein the action words directory further comprises multiple sheets connected to and overlying at least a part of the front surface of the second panel, wherein the sheets include lists of verbs categorized according to tense, person and number, wherein tabs are connected to selected sheets for indicating contents of the sheets, and wherein the tabs extending from the sheets are staggered for facilitating user identification and selection.

13. The apparatus of claim 12, wherein the sheets are stacked and are connected along single edges to the front surface of the second sheet by a connector that allows the sheets to be rotated about the connected edges.

14. The apparatus of claim 8, wherein the expanded lexical data directory further comprises multiple sheets connected to and overlying at least a part of the front surface of the fourth panel classified in categories, wherein the sheets have provided thereon categories of words and phrases, wherein the words and phrases of each category are arranged in alphabetical order, lettered tabs extending from selected sheets for indicating contents of each page, and word tags extending from selected sheets for indicating the categories, and wherein the lettered tabs are staggered and the word tags are staggered for facilitating user identification and selection.

15. The apparatus of claim 14, wherein the sheets are stacked and are connected along single edges to the front surface of the second sheet by a connector that allows the sheets to be rotated about the connected edges.

16. The apparatus of claim 8, further comprising at least one pronunciation key included in at least one directory, wherein the at least one pronunciation key further comprises a first row of first language vowels, a second row of second language equivalents to the first language vowels, a third row of transliterations of the second language equivalents, and a fourth row having a linguistic mnemonic sentence.

17. The apparatus of claim 8, wherein the directories further comprise multiple entries arranged in columns, and wherein each entry further comprises a first language term, a second language equivalent of the first language term and a transliteration of the second language equivalent.

18. The apparatus of claim 17, wherein the first language term of each entry is positioned at a left hand side of the column, the second language equivalent of the first language term is positioned on a same line as the first language term and to a right of the first language term, and the transliteration of the second language equivalent is positioned directly beneath the second language equivalent.

19. A method for translating and generating sentences comprising the steps of providing a translation system having a responses section, a sentence starter section, an action words section, a support words section, an expanded lexical data section and at least one pronunciation box, wherein the sections are arranged such that a user sequentially proceeds from the sentence starters section to the action words sections, to the support words section and to the expanded lexical data section when generating sentences and with the responses section positioned for reference prior to the sentence starters section or after the expanded lexical data section.

20. The method of claim 19, further comprising a response section which comprises a list of words and phrases commonly heard in response to questions, wherein the sentence starters section further comprises a question words subsection having a list of interrogatives and a subjects subsection having a list of words frequently used to begin sentences, wherein the action words section further comprises a list of verbs or infinitives, wherein the support words section further comprises a list of words and phrases of various parts of speech including adverbs, adjectives, prepositions, pronouns and conjunctions, wherein the expanded lexical data section further comprises a list of commonly used words and phrases, and wherein each word and phrase in each list has a first language entry, a second language equivalent of the first language entry and a transliteration of the second language equivalent, pronouncing a sentence starter, wherein the pronouncing a sentence starter further comprises selecting a sentence starter from the sentence starters section, identifying a second language equivalent of the sentence starter, reviewing a transliteration of the second language equivalent of the sentence starter, reviewing vowel sounds as indicated in the pronunciation box, applying the vowel sounds to syllables of the transliteration, and formulating a pronunciation of the transliteration of the second language equivalent of the sentence starter, pronouncing an action word, wherein the pronouncing an action word further comprises selecting an action word from the action words section, identifying a second language equivalent of the action word, reviewing a transliteration of the second language equivalent of the action word, reviewing vowel sounds as indicated in the pronunciation box, applying the vowel sounds to syllables of the transliteration, and formulating a pronunciation of the transliteration for the second language equivalent of the action word, pronouncing at least one support word, wherein the pronouncing at least one support word further comprises selecting a support word from the support words section, identifying a second language equivalent of the support word, reviewing a transliteration of the second language equivalent of the support word, reviewing vowel sounds as indicated in the pronunciation box, applying the vowel sounds to syllables of the transliteration, and formulating a pronunciation of the transliteration for the second language equivalent of the support word, and pronouncing at least one entry from the lexical data section, wherein the pronouncing at least one entry from the lexical data section further comprises selecting an entry from the expanded lexical data section, identifying a second language equivalent of the entry, reviewing a transliteration of the second language equivalent of the entry, reviewing vowel sounds as indicated in the pronunciation box, applying the vowel sounds to syllables of the transliteration, and formulating a pronunciation of the transliteration for the second language equivalent of the entry, and wherein the action words section further comprises multiple pages, wherein the expanded lexical data section further comprises multiple pages, wherein pronouncing an action word further comprises reviewing tabs extending from the multiple pages of the action words section, selecting an appropriate tag of a desired page, and rotating the desired page along with all pages overlying the desired page, and wherein pronouncing at least one entry from the expanded lexical data section further comprises reviewing tabs extending from the multiple pages of the expanded lexical data section, selecting an appropriate tag of a desired page, and rotating the desired page along with all pages overlying the desired page.

* * * * *